US010012361B2

(12) United States Patent
Stavely et al.

(10) Patent No.: US 10,012,361 B2
(45) Date of Patent: Jul. 3, 2018

(54) MULTI-SPECTRAL VARIABLE FOCUS ILLUMINATOR

(71) Applicant: ADL, Inc., Chiyoda-ku (JP)

(72) Inventors: Donald J. Stavely, Windsor, CO (US); James S. Voss, Clovis, CA (US); Mark J. Bianchi, Fort Collins, CO (US); Frank Holloway, Loveland, CO (US)

(73) Assignees: ADL, INC., Tokyo (JP); MIKAMI & CO., LTD, Yokohama (JP)

( * ) Notice: Subject to any disclaimer, the term of this patent is extended or adjusted under 35 U.S.C. 154(b) by 336 days.

(21) Appl. No.: 14/424,665

(22) PCT Filed: Aug. 30, 2013

(86) PCT No.: PCT/US2013/057698
§ 371 (c)(1),
(2) Date: Feb. 27, 2015

(87) PCT Pub. No.: WO2014/036509
PCT Pub. Date: Mar. 6, 2014

(65) Prior Publication Data
US 2015/0211708 A1  Jul. 30, 2015

Related U.S. Application Data

(60) Provisional application No. 61/695,866, filed on Aug. 31, 2012.

(51) Int. Cl.
*F21V 5/00* (2018.01)
*F21V 23/04* (2006.01)
(Continued)

(52) U.S. Cl.
CPC .............. *F21V 5/007* (2013.01); *F21V 14/02* (2013.01); *F21V 14/06* (2013.01); *F21V 23/003* (2013.01);
(Continued)

(58) Field of Classification Search
CPC ........ F21V 5/007; F21V 23/003; F21V 14/02; F21V 14/06; F21V 23/0464;
(Continued)

(56) References Cited

U.S. PATENT DOCUMENTS 5,068,768 A   12/1991 Kobayashi
5,734,934 A   3/1998 Horinishi et al.
(Continued)

FOREIGN PATENT DOCUMENTS

GB   2 454 457 A   5/2009
WO   2011/024193 A2   3/2011

OTHER PUBLICATIONS

International Search Report and Written Opinion of PCT/US2013/057698 dated Feb. 7, 2014, 27 pages.
(Continued)

*Primary Examiner* — Joseph Suh
(74) *Attorney, Agent, or Firm* — Kilpatrick Townsend & Stockton LLP

(57) ABSTRACT

A multi-spectral variable focus illuminator. The illuminator includes a plurality of first light sources arranged in a first array, each of the first light sources capable of emitting light in a first wavelength band, and a plurality of second light sources arranged in a second array, each of the second light sources capable of emitting light in a second wavelength band different from the first wavelength band. The illuminator includes an array of lenses positioned in front of the light sources. The relative positions of the lens array and the first and second light sources are changeable such that the field illuminated by the first light sources varies in size with the relative positions of the lens array and the first light sources, and the field illuminated by the second light sources varies in size with the relative positions of the lens array and the second light sources.

26 Claims, 24 Drawing Sheets

(51) Int. Cl.

| | | |
|---|---|---|
| *F21V 14/02* | (2006.01) | |
| *F21V 14/06* | (2006.01) | |
| *G02B 13/00* | (2006.01) | |
| *F21V 23/00* | (2015.01) | |
| *G02B 3/00* | (2006.01) | |
| *F21V 33/00* | (2006.01) | |
| *F21W 131/40* | (2006.01) | |
| *F21Y 115/10* | (2016.01) | |
| *F21Y 113/13* | (2016.01) | |

(52) U.S. Cl.
CPC ........ *F21V 23/0464* (2013.01); *G02B 3/0056* (2013.01); *G02B 13/0015* (2013.01); *F21V 33/0052* (2013.01); *F21W 2131/40* (2013.01); *F21Y 2113/13* (2016.08); *F21Y 2115/10* (2016.08)

(58) Field of Classification Search
CPC .............. F21V 33/0052; G02B 3/0056; G02B 13/0015; F21Y 2115/10; F21Y 2113/13; F21W 2131/40
See application file for complete search history.

(56) References Cited

U.S. PATENT DOCUMENTS

| | | | |
|---|---|---|---|
| 6,825,930 B2 | 11/2004 | Cronin et al. | |
| 6,866,401 B2 * | 3/2005 | Sommers | F21V 5/006 |
| | | | 362/169 |
| 7,233,354 B2 | 6/2007 | Voss et al. | |
| 7,529,478 B2 | 5/2009 | Cutler et al. | |
| 2002/0196639 A1 | 12/2002 | Weidel | |
| 2002/0198665 A1 * | 12/2002 | Seul | B01L 3/502761 |
| | | | 702/20 |
| 2003/0107888 A1 | 6/2003 | Devlin et al. | |
| 2003/0117797 A1 | 6/2003 | Sommers et al. | |
| 2005/0167615 A1 * | 8/2005 | Saito | B82Y 10/00 |
| | | | 250/492.22 |
| 2006/0056058 A1 | 3/2006 | Chong et al. | |
| 2007/0045640 A1 * | 3/2007 | Erchak | B82Y 20/00 |
| | | | 257/98 |
| 2008/0130126 A1 * | 6/2008 | Brooks | G02B 27/2214 |
| | | | 359/619 |
| 2008/0151052 A1 | 6/2008 | Erel et al. | |
| 2008/0304536 A1 * | 12/2008 | Gold | F21S 10/02 |
| | | | 372/101 |
| 2009/0296390 A1 * | 12/2009 | Dubord | B60Q 1/24 |
| | | | 362/240 |
| 2010/0020292 A1 * | 1/2010 | Chou | G03B 21/2033 |
| | | | 353/38 |
| 2010/0141153 A1 * | 6/2010 | Recker | H05B 33/0803 |
| | | | 315/149 |
| 2010/0321263 A1 * | 12/2010 | Bosshard | H01Q 3/20 |
| | | | 343/757 |
| 2011/0026908 A1 * | 2/2011 | Nishimura | G02B 27/646 |
| | | | 396/55 |
| 2011/0063824 A1 * | 3/2011 | Qiu | F21L 4/027 |
| | | | 362/188 |
| 2011/0063856 A1 * | 3/2011 | Mintz | F21V 5/006 |
| | | | 362/331 |
| 2011/0157487 A1 * | 6/2011 | Akeyama | G03B 5/02 |
| | | | 348/759 |
| 2011/0216884 A1 * | 9/2011 | Tsujii | A61B 6/06 |
| | | | 378/62 |
| 2011/0221353 A1 * | 9/2011 | Tseng | H05B 37/0227 |
| | | | 315/217 |
| 2012/0020071 A1 * | 1/2012 | McKenzie | A01G 7/045 |
| | | | 362/231 |
| 2012/0039592 A1 * | 2/2012 | Chou | G03B 7/08 |
| | | | 396/164 |
| 2012/0095458 A1 * | 4/2012 | Cybulski | A61B 1/00071 |
| | | | 606/41 |
| 2012/0121244 A1 * | 5/2012 | Stavely | F21V 5/007 |
| | | | 396/175 |
| 2012/0147192 A1 * | 6/2012 | Wright | H04N 7/185 |
| | | | 348/159 |
| 2012/0292481 A1 * | 11/2012 | Hutchin | F41H 13/0062 |
| | | | 250/201.9 |
| 2013/0020929 A1 * | 1/2013 | van de Ven | H01L 25/0753 |
| | | | 313/498 |
| 2013/0039080 A1 * | 2/2013 | Yamazaki | F21S 48/1784 |
| | | | 362/465 |
| 2013/0046881 A1 * | 2/2013 | Seelman | H04L 12/2809 |
| | | | 709/224 |
| 2013/0064531 A1 * | 3/2013 | Pillman | H04N 5/23296 |
| | | | 396/62 |
| 2013/0093354 A1 * | 4/2013 | Jiang | F21K 9/135 |
| | | | 315/294 |
| 2014/0055032 A1 * | 2/2014 | Keller | H05B 33/0803 |
| | | | 315/85 |
| 2014/0210967 A1 * | 7/2014 | Kirkerud | G07F 7/0609 |
| | | | 348/61 |
| 2014/0233109 A1 * | 8/2014 | Nakano | G02B 7/028 |
| | | | 359/700 |

OTHER PUBLICATIONS

Author Unknown, "7 Cell Cluster Zoom Optic—Part No. 130," Polymer Optics Ltd., 2008, 1 page.
Author Unknown, "Infrared Illuminator X-Zoom," Applied Infrared Sensing, no date, retrieved from http://www.securitydefence.com.au/wp-content/uploads/2010/05/X-Zoom-IR.pdf on May 31, 2012, 1 page.
Author Unknown, "Varifocal IR Illuminator," Secube USA, no date, retrieved from http://www.secubeusa.com/downloads/pdf/SeCube_IR_Illuminator_03.10.11_v1_3.pdf on May 31, 2012, 1 page.
Author Unknown, "ZOOM-Series Infrared Illuminators," Axton Technology, no date, retrieved from http://www.axtontech.com/images/shop/filebrowser/File/ZOOM%20Series%20General%20Flyer.pdf on May 31, 2012, 1 page.
International Search Report and Written Opinion of PCT/US2011/060315 dated Apr. 9, 2012, 14 pages.

\* cited by examiner

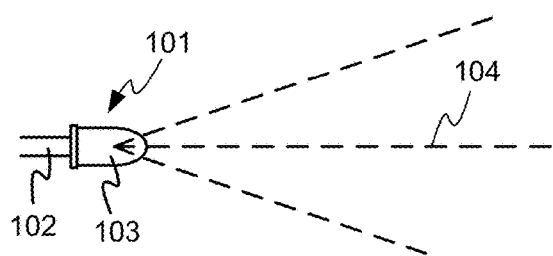
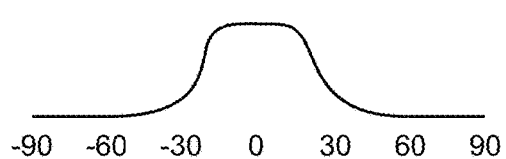
FIG. 1A
FIG. 1B
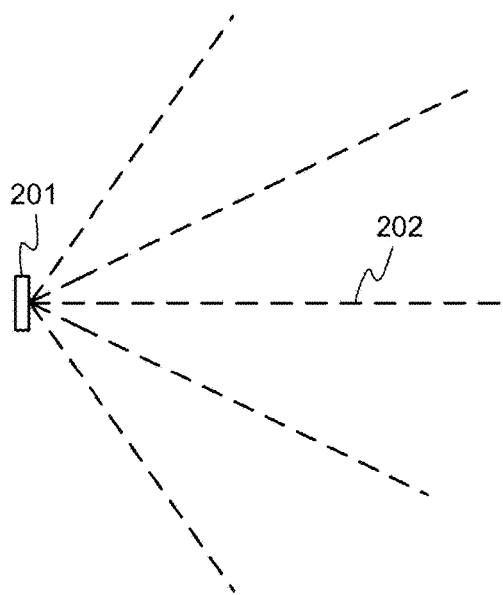
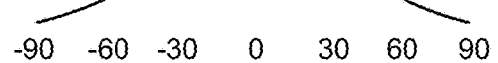
FIG. 2A
FIG. 2B

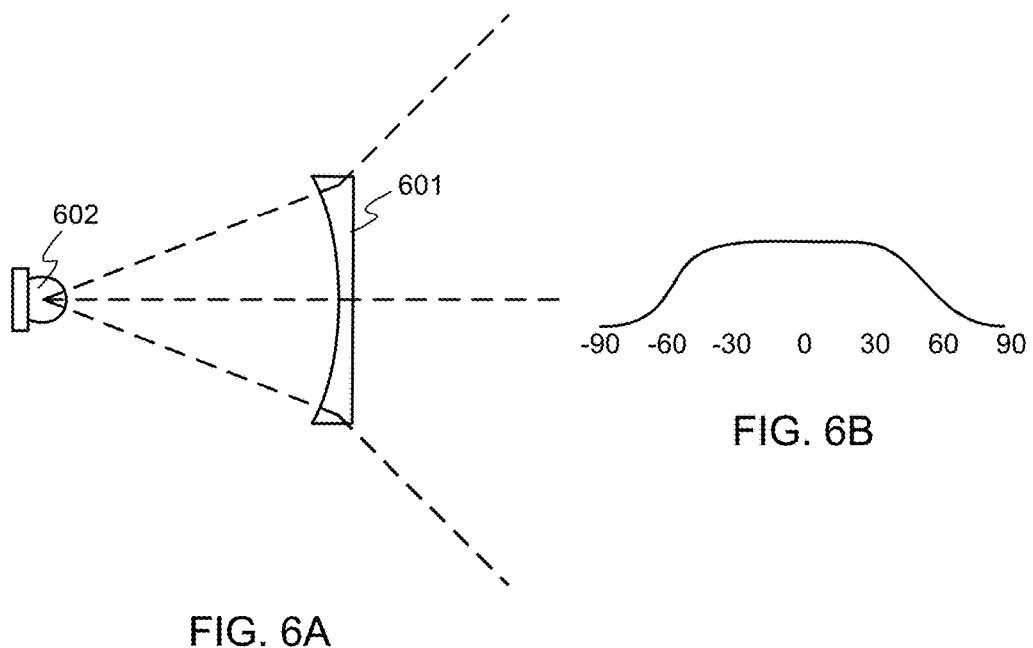
FIG. 6A
FIG. 6B
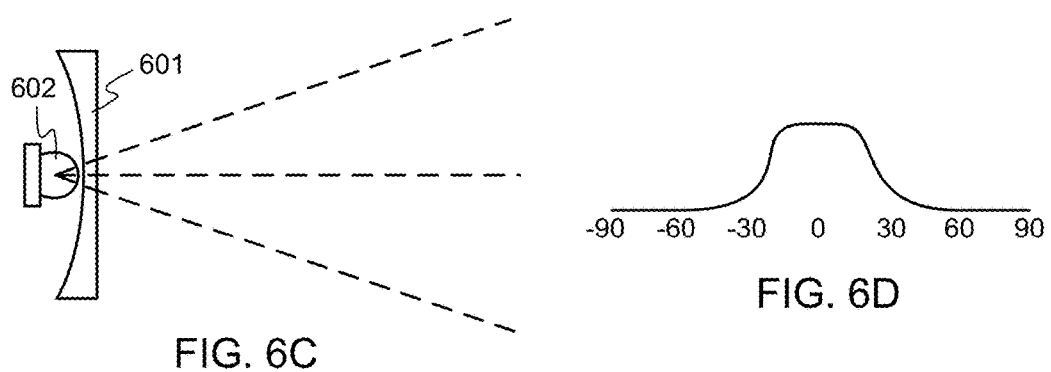
FIG. 6C
FIG. 6D

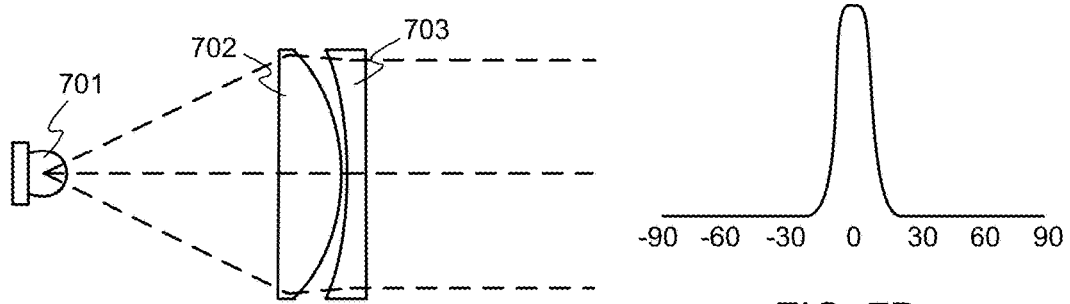
FIG. 7B
FIG. 7A
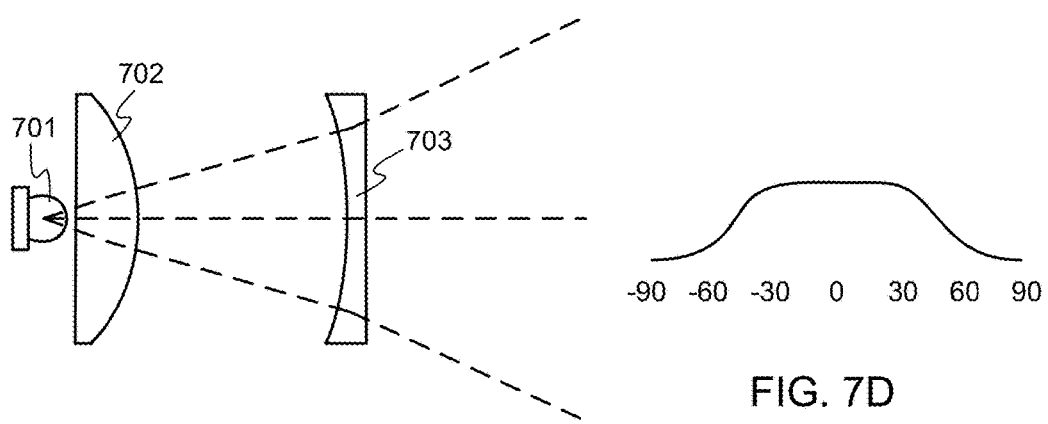
FIG. 7D
FIG. 7C

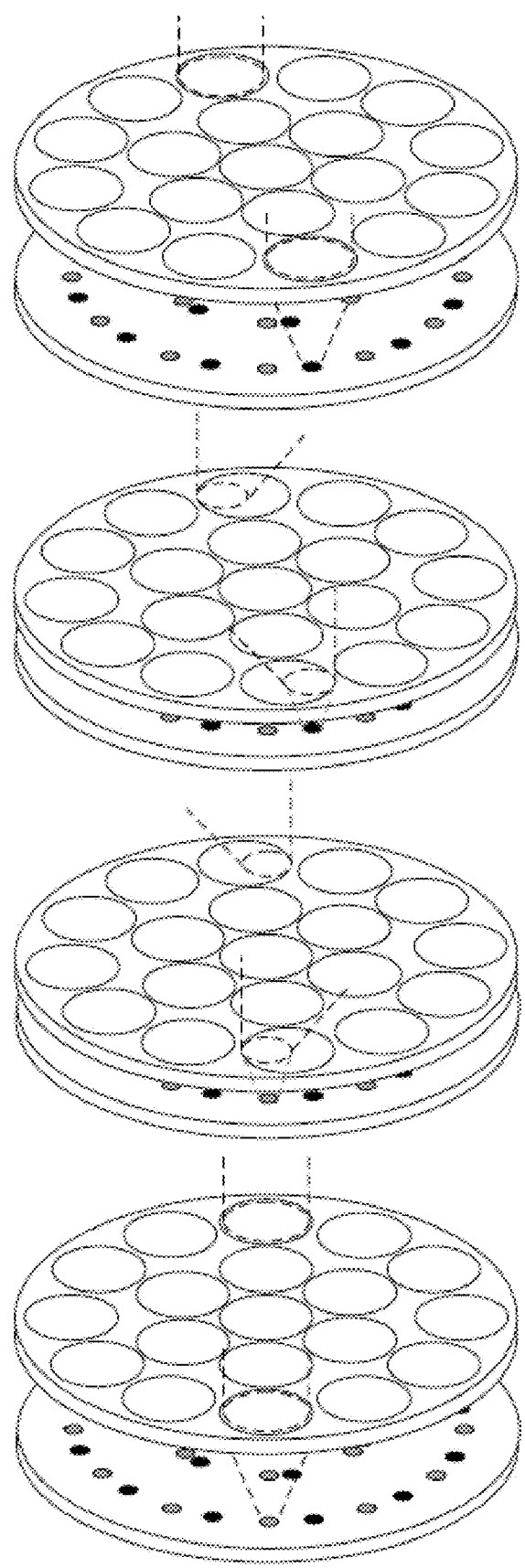

MULTI-SPECTRAL VARIABLE FOCUS ILLUMINATOR

CROSS REFERENCE TO RELATED APPLICATIONS

This application is a U.S. national phase entry under 35 U.S.C. § 371 of International Patent Application No. PCT/US2013/057698 filed Aug. 30, 2013, which claims the benefit of U.S. Provisional Patent Application No. 61/695,866 filed Aug. 31, 2012, both titled "Multi-spectral Variable Focus Illuminator", and the entire disclosures of which are hereby incorporated by reference herein.

This application is related to U.S. Provisional Patent Application No. 61/456,891 filed Nov. 15, 2010 and titled "Variable Focus Illuminator", and U.S. patent application Ser. No. 13/294,026 filed Nov. 10, 2011 and titled "Variable Focus Illuminator", the entire disclosures of which are hereby incorporated by reference herein.

BACKGROUND OF THE INVENTION

Illuminators are used in conjunction with video security cameras where and when the available light is insufficient for quality observation or recording of the subject scene. Examples of situations that would benefit from the use of an illuminator are unlit or partially lit parking lots, storage facilities, warehouses, office spaces, manufacturing facilities, and the like. These areas of interest for video observation include both indoor and outdoor spaces. For outdoor use, the security camera and the illuminator may be designed to be rugged and weatherproof Illuminators used in video security applications may provide visible light, infrared (IR) light, or both. The electronic sensors used in modern video cameras are intrinsically sensitive to both visible light and infrared light. When ambient light (sunlight or artificial light) is available and abundant, video cameras typically employ an infrared blocking filter that prevents infrared light collected by the camera's lens from reaching the sensor. Reducing or eliminating the infrared light allows for more accurate color rendition in the video image. When there is not sufficient ambient light for good color imaging, it is advantageous to remove the infrared blocking filter so that both infrared and visible light reach the sensor. The resulting image may not be as color-accurate as an image taken using only visible light, but the greater amount of available light makes it possible to produce an image higher quality in other respects, for example an image with less noise.

These video cameras with so-called "day-night" capability greatly extend the range of conditions in which usable video images can be obtained. Still, there are many locations and situations where the available light is not sufficient. These installations benefit from the use of illuminators to augment the available light. The advantage if IR illuminators is that the illuminator adds light that is visible to the camera, but invisible (or nearly invisible) to humans. This may be advantageous for several reasons. For example, some installations are designed to be covert. That is, in these installations, it is not desirable that subjects in the field of the video camera are aware that they are being observed or recorded. Some regions or municipalities also limit the amount of visible artificial light that is used at night. The goal of such "Dark Sky" initiatives is to reduce light pollution so that people can enjoy the night sky. Other reasons for using infrared illuminators are simply the annoyance, distraction, and ergonomic factors associated with the use of additional visible light.

The range of wavelengths typically used for IR illuminators in conjunction with day/night cameras is referred to as "near infrared". Two common wavelengths of light produced by IR illuminators are 850 and 940 nm, although other wavelengths or ranges of wavelengths could be used. Illuminators producing light at a wavelength of 850 nm are commonly used because video sensors are reasonably sensitive at this wavelength. The human eye is weakly sensitive at 850 nm, so the illuminator is not truly covert—it will be seen to glow a deep red color. Illuminators producing light at a wavelength of 940 nm are used for covert illumination, since the eye is insensitive at this wavelength. The primary disadvantage of 940 nm is that the sensitivity of typical visible light sensors is significantly lower at this wavelength.

Different security cameras may have different fields of view, and some security cameras include zoom lenses such that the field of view of the camera is variable. There is accordingly a need for improved illuminators useful with cameras of differing or variable fields of view.

BRIEF SUMMARY OF THE INVENTION

According to one aspect, a multi-spectral variable focus illuminator includes a plurality of first light sources arranged in a first array, and each of the first light sources is capable of emitting light in a first wavelength band. The multi-spectral variable focus illuminator also includes a plurality of second light sources arranged in a second array, and each of the second light sources is capable of emitting light in a second wavelength band different from the first wavelength band. The multi-spectral variable focus illuminator further includes an array of lenses positioned in front of the light sources. The relative positions of the array of lenses and the first and second light sources are changeable such that the size of the field illuminated by the first light sources varies with the relative positions of the array of lenses and the first light sources, and the size of the field illuminated by the second light sources varies with the relative positions of the array of lenses and the second light sources.

According to another aspect, a variable focus illuminator comprises an array of light sources arranged in an oblong pattern, and an array of lenses of lenses positioned in front of the array of light sources in the same oblong pattern. The array of lenses is movable in a combination of rotation about the optical axis of the variable focus illuminator and translation along the optical axis of the variable focus illumination such that the size of the field of illumination produced by the variable focus illuminator varies with the relative positions of the array of lenses and the array of light sources. Due to the oblong shape of the pattern, when the array of lenses is positioned such that the variable focus illuminator produces a narrow beam, the field of illumination is substantially circular, and when the array of lenses is positioned such that the variable focus illuminator produces a diverging beam, the field of illumination is oblong.

According to another aspect, a variable focus illuminator comprises an array of light sources arranged in a first oblong pattern, and an array of lenses of lenses positioned in front of the array of light sources in a second oblong pattern. The array of lenses is movable in a combination of rotation about the optical axis of the variable focus illuminator and translation along the optical axis of the variable focus illumination such that the size of the field of illumination produced by the variable focus illuminator varies with the relative positions of the array of lenses and the array of light sources. When the array of lenses is positioned such that the variable focus illuminator produces a narrow beam, the field of illumination is oblong.

According to another aspect, a method of illuminating a scene using a multi-spectral variable focus illuminator comprises energizing a plurality of first light sources arranged in a first array, each of the first light sources emitting light in a first wavelength band, and adjusting the position of an array of lenses disposed in front of the plurality of first light sources such that the size of the field illuminated by light from the first light sources varies in size as the array of lenses moves. The method further includes energizing a plurality of second light sources arranged in a second array, each of the second light sources emitting light in a second wavelength band different from the first wavelength band, and adjusting the position of the array of lenses such that the size of the field illuminated by light from the second light sources varies in size as the array of lenses moves.

According to another aspect, a system comprises a camera and a multi-spectral variable focus illuminator. The multi-spectral variable focus illuminator further includes a plurality of first light sources arranged in a first array, each of the first light sources capable of emitting light in a first wavelength band, a plurality of second light sources arranged in a second array, each of the second light sources capable of emitting light in a second wavelength band different from the first wavelength band, and an array of lenses positioned in front of the first and second light sources. The relative positions of the array of lenses and the first and second light sources are changeable such that the size of the field illuminated by the first light sources varies with the relative positions of the array of lenses and the first light sources, and the size of the field illuminated by the second light sources varies with the relative positions of the array of lenses and the second light sources.

BRIEF DESCRIPTION OF THE DRAWINGS

FIG. 1A illustrates an example light emitting diode (LED) in a leaded package.

FIG. 1B illustrates the intensity of light produced by the LED of FIG. 1A as a function of angle from the optical axis of the LED.

FIG. 2A illustrates another example LED.

FIG. 2B illustrates the intensity of light produced by the LED of FIG. 2A as a function of angle from optical axis of the LED.

FIGS. 6A-6D illustrate the use of a simple negative refractive lens to vary the illumination field of an LED, in accordance with embodiments of the invention.

FIGS. 7A-7D illustrate a use of multiple lens elements to vary the illumination field of an LED, in accordance with embodiments of the invention.

FIGS. 19A-19D show additional configurations of the components of FIG. 17.

DETAILED DESCRIPTION OF THE INVENTION

Figure 3A:
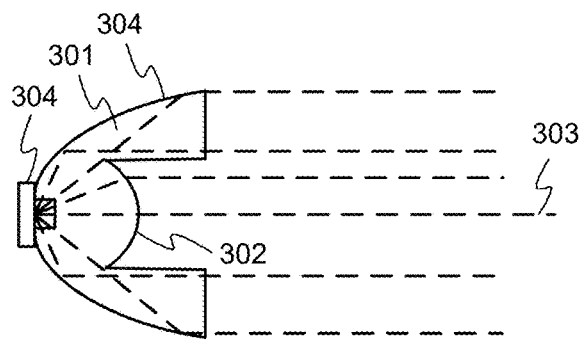
FIG. 3A illustrates a particular type of prior art concentrator.

Two common types of video security camera configurations are "fixed" cameras and "pan/tilt/zoom" (PTZ) cameras. Fixed cameras are used to observe or record images of a single fixed field of view. They are aimed during the installation process and typically not changed over their operating life. Since the camera lenses used in fixed applications need only cover a fixed field of view, they need only be designed for a fixed focal length. However, it is often not known at setup time exactly what lens focal length will be required for a particular installation. It is very inconvenient for the installer to have to stock and transport an array of lenses of incrementing focal lengths to cover all of the possible values that might be needed for any particular installation. For this reason, cameras designed for fixed applications typically use "varifocal" lenses. These lenses can be manually adjusted over a range of focal lengths. The camera can be aimed, be set in magnification or field of view, and focused at installation time, without detailed prior knowledge of the application or installation site. Only one or two varifocal lenses are needed to cover a very wide range of possible focal lengths.

A PTZ camera includes a motorized zoom lens, mounted on a motorized pan/tilt mechanism. The field of view of the camera, including both the direction of aim and the magnification of the video image, may be controllable remotely and in real-time. PTZ cameras are often controlled by an operator who can, for example, monitor a wide angle scene under normal conditions, and then re-aim the camera and zoom in on some object or activity of interest. Alternatively, the PTZ camera can be automatically controlled. For example, it could be panned slowly to cover a wide area at moderate magnification, or it could be programmed to move and zoom in on a series of areas of interest, such as entrances and exits to a building, parking lot, etc.

Thus, both fixed camera and PTZ cameras may use lenses with variable focal length—either varifocal or motorized zoom. However, many existing IR illuminators have fixed illumination patterns. Illuminators are typically offered with angles of illumination in steps of 10, 20, 30, 45, and 60 degrees, for example. For a particular physical size, power input, and total light power output, the intensity of the light falling on any point within the area of illumination will be inversely proportional to area of coverage. In other words, the illuminator is designed to concentrate its light output into a narrow angle, or to spread it over a wide angle. It is therefore advantageous to match the field of illumination of an illuminator with the field of view of a camera used in conjunction with the illuminator. For example, if the illumination field is narrower than the camera's field of view, only the center part of the field of view will be lit, and the surrounding part of the image will be dark. On the other hand, if the illumination angle is wider than the camera coverage, light will be wasted illuminating areas unseen by the camera, and the area seen by the camera will not receive as much light.

FIGS. 1A-9C illustrate certain components and optical principles usable in illuminators according to embodiments of the invention.

FIG. 1A illustrates an example light emitting diode (LED) 101 in a leaded package. Leads 102 are designed for mounting LED 101 onto a circuit board. LEDs may be especially useful as light sources in embodiments of the invention due to their high reliability and very efficient production of light in relation to the electrical power they consume, but it will be recognized that illuminators according to embodiments of the invention may use other kinds of light sources. For example, embodiments of the invention may use light sources that emit visible light and/or infrared light. Light sources other than LEDs may be used, and light sources of multiple types may be used. LED 101 also includes an integral molded plastic lens 103 that is designed to substantially direct light produced by LED 101 into a fixed illumination field around an optical axis 104. FIG. 1B illustrates the intensity of light produced by LED 101 as a function of angle from optical axis 104. In this example, the intensity drops dramatically beyond an angle of about 22.5 degrees from axis 104, and LED 101 may be said to have an illumination angle of about 45 degrees. Other LEDs of this type may have other viewing angles, for example 15, 30, or 60 degrees or another angle, depending on the particular designs of their integral lenses.

FIG. 2A illustrates another example LED 201. LED 201 does not have an integral molded lens, and does not include a leaded package, but is instead designed for surface mounting to a circuit board. As shown in FIG. 2B, the illumination field of LED 201 is broader and less sharply defined than the illumination field of LED 101. For example, the intensity of illumination may be approximately Lambertian, such that the intensity of LED 201 as observed from a particular viewing angle relative to optical axis 202 is approximately proportional to the cosine of the viewing angle, although other intensity distributions may be possible.

Other types of LEDs are also available and usable in embodiments of the invention, for example surface mountable LEDs that also include integral lenses. Preferably, the LEDs and other illuminator components are designed for high power operation. For example, each LED may have a thermal stud (not shown) under the die in addition to or integrated with its leads for making good thermal contact with a circuit board on which the LED is mounted. In some embodiments, a metal-core circuit board may be used, having an inner layer made of a thermally conductive material such as copper or aluminum for conducting heat away from the LEDs. The metal-core board may in turn be mounted in thermal contact with a heat sink, or to an enclosure having heat dissipating fins or other means of cooling.

Figure 3B:
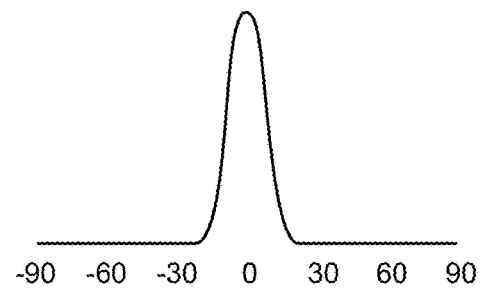
FIG. 3B illustrates the intensity of light produced by the concentrator of FIG. 3A as a function of angle from the optical axis of the concentrator.

FIG. 3A illustrates a particular type of prior art concentrator 301 that has been used with LEDs, for example LEDs similar to LED 102, to direct the light in the wide pattern generated by the LED into a narrow beam. Concentrator 301 works using a combination of refraction and total internal reflection. Lens element 302 refracts the light emanating at shallow to moderate angles from the axis 303 of the LED 304, and parabolic reflective element 305 reflects the light emanating at steeper angles via total internal reflection. The resulting illumination beam may be narrow, as illustrated in FIG. 3B. With careful design, concentrator 301 may be molded as a single low cost clear plastic part. Concentrator 301 may be called a "TIR concentrator", because the parabolic surface reflects light using total internal reflection.

Figure 4A:
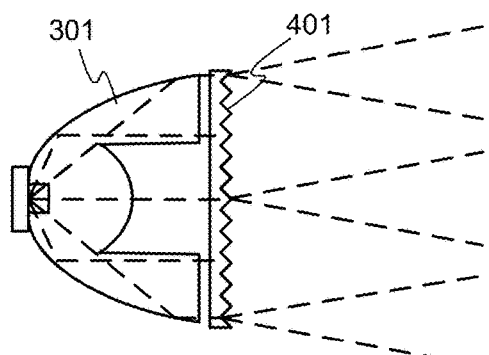
FIG. 4A illustrates the concentrator of FIG. 3A with a diffuser attached.
Figure 4B:
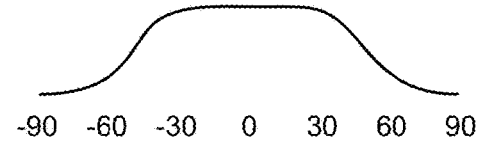
FIG. 4B illustrates the intensity of light produced by the arrangement of FIG. 4A as a function of angle from the optical axis.

It will be appreciated that the functioning of TIR concentrator 301 depends on maintaining the precise positional relationship between concentrator 301 and LED 304, and thus TIR concentrator 301 is not easily amenable to adjustment to vary the illumination field. As illustrated in FIG. 4A, a diffusing element 401 may be added to a TIR concentrator to produce a wider illumination field as shown in FIG. 4B. Diffusing element 401 may be frosted, or may have a pattern of small facets that refract the light through the desired angles. However, the resulting illumination field is still fixed, and installing a different diffuser element may be inconvenient in the field.

Figures 5A, 5B:
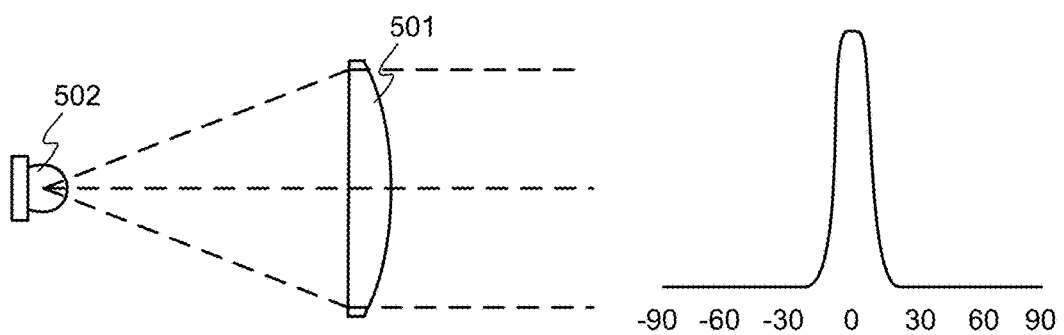
FIGS. 5A-5D illustrate the use of a simple positive refractive lens to vary the illumination field of an LED, in accordance with embodiments of the invention.
Figures 5C, 5D:
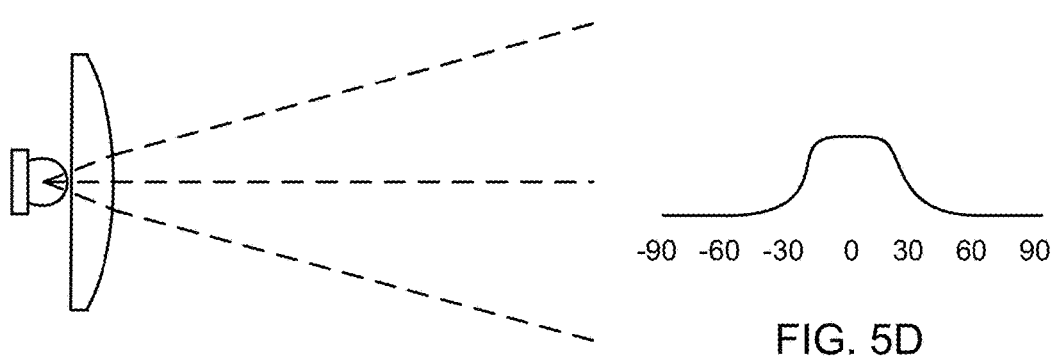

FIGS. 5A-5D illustrate the use of a simple positive refractive lens 501 to vary the illumination field of an LED 502, in accordance with embodiments of the invention. In FIG. 5A, LED 502 is placed at approximately the focal point of the lens, and the light emanating from LED 502 is directed substantially into a narrow beam, for example having the distribution shown in FIG. 5B. In FIG. 5C, lens 501 has been moved toward LED 502 (or LED 502 moved toward lens 501), and the light is defocused into a wider beam, for example having the distribution shown in FIG. 5D. Placing lens 501 and LED 502 in a relationship intermediate between those shown in FIGS. 5A and 5C will result in an illumination distribution intermediate between those shown in FIGS. 5B and 5D. When the lens and LED are closest together, the positive power of the lens affects the beam pattern of the LED the least, although the beam is still somewhat narrower than the light distribution produced by the LED itself. In other words, the lens still has a converging effect, but much less than when the LED is at the approximate focal point of the lens.

FIGS. 6A-6D illustrate the use of a simple negative refractive lens 601 to vary the illumination field of LED 602, in accordance with embodiments of the invention. When lens 601 is placed further away from LED 602, as shown in FIG. 6A, the beam will be maximally diverged, for example having an angular distribution as shown in FIG. 6B. When lens 601 and LED 602 are closest together, as shown in FIG. 6C, the negative power of lens 601 affects the beam pattern of LED 601 the least, and the beam may have an angular distribution similar to that shown in FIG. 6D. The beam will still be somewhat wider than that produced by the LED itself.

FIGS. 7A-7D illustrate a use of multiple lens elements to vary the illumination field of LED 701, in accordance with embodiments of the invention. The system of FIGS. 7A-7D may result in a broader range of adjustment than is achievable with a single lens. In this example, a relatively strong positive lens element 702 is placed immediately in front of LED 701, and is movable toward and away from LED 701. A relatively weaker negative (concave) lens element 703 is placed at a fixed position beyond positive element 702. When the (strong) positive lens is closest to the (weak) negative element, as shown in FIG. 7A, they can be considered together as a composite element with moderate positive power. As above, if the LED and lenses are positioned such that the LED is at the approximate focal point of the composite element(s), the resulting beam will be maximally focused, for example having an angular distribution similar to that shown in FIG. 7B. If positive element 702 is moved toward LED 701 and away from negative element 703, the beam will be gradually defocused or dispersed. As above, when positive lens element 702 is closest to LED 701 as shown in FIG. 7C, the beam will be maximally defocused, for example having an angular distribution similar to that shown in FIG. 7D. As compared to the case above, the combined use of a fixed negative lens and a moving positive lens provides a greater range of beam angles between narrow (maximally focused) and wide (maximally defocused) angular distributions. The greatest difference in performance may be in the wide angle case. This is because the positive element's converging effect is minimized when it is closest to the LED, while the diverging effect of the negative element remains.

Figure 8A:
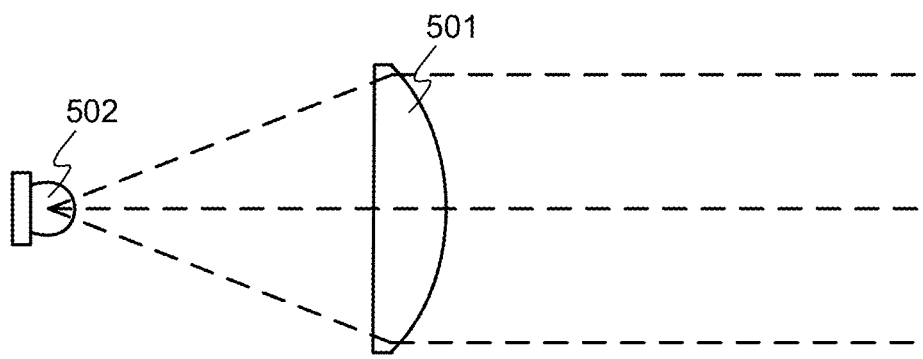
FIGS. 8A-8C illustrate an arrangement similar to that of FIG. 5A, but with an additional degree of freedom that may improve the wide angle performance an illuminator, in accordance with embodiments of the invention.
Figure 8B:
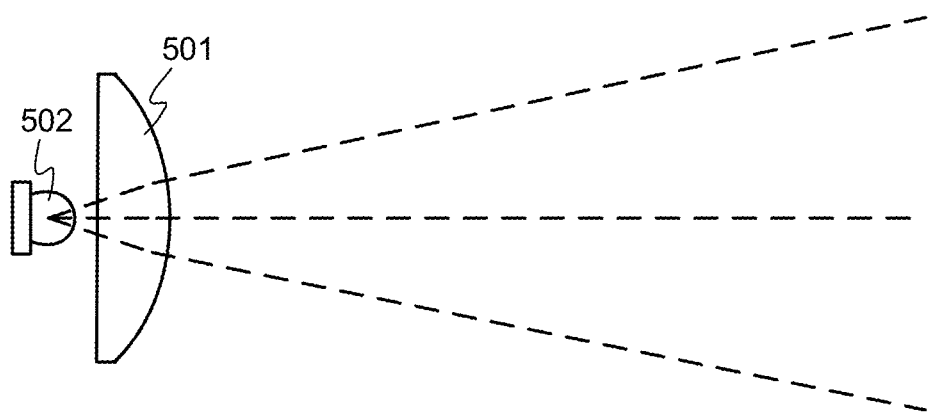
Figure 8C:
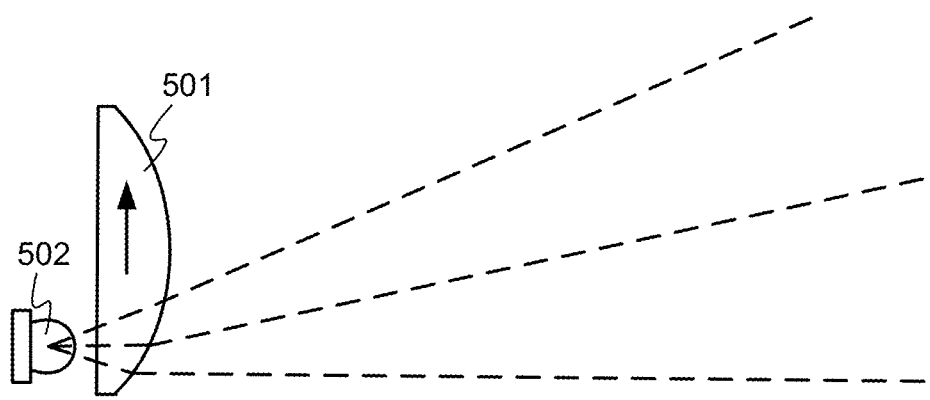

FIGS. 8A-8C illustrate an arrangement similar to that of FIG. 5A, but with an additional degree of freedom that may improve the wide angle performance an illuminator in accordance with embodiments of the invention. In the example configuration of FIG. 8A, LED 502 is positioned approximately at the focal point of lens 501, resulting in a narrow illumination field. In the configuration of FIG. 8B, LED 502 and lens 501 are positioned more closely together, resulting in a somewhat wider illumination field. In FIG. 8C, lens 501 has been additionally moved transversely to the optical axis of LED 502. This causes the diverging beam to be skewed from the optical axis of LED 502. It is useful to think of positive lens 501 when it is directly in front of LED 502, but displaced laterally, as behaving as a wedge prism. The diverging light from LED 502 is refracted laterally as it exits lens 501.

Figure 9A:
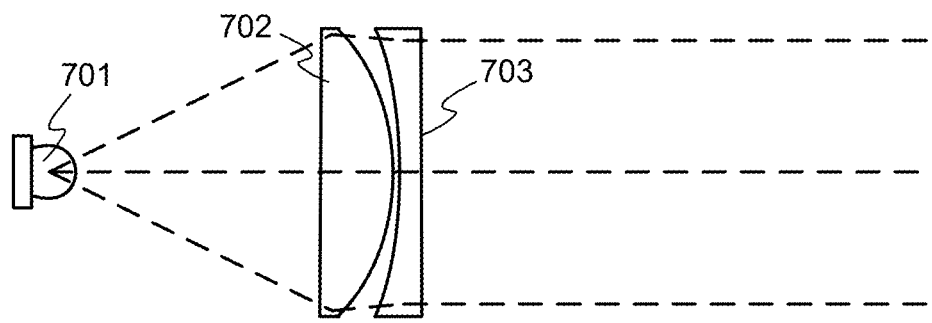
FIGS. 9A-9C illustrate an arrangement similar to that of FIG. 7A, with an additional degree of freedom similar that that shown in FIG. 8C, that may improve the wide angle performance an illuminator, in accordance with embodiments of the invention.
Figure 9B:
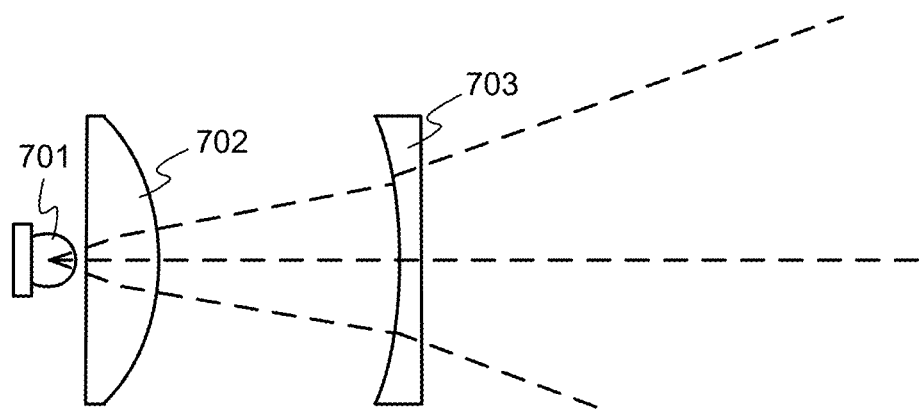
Figure 9C:
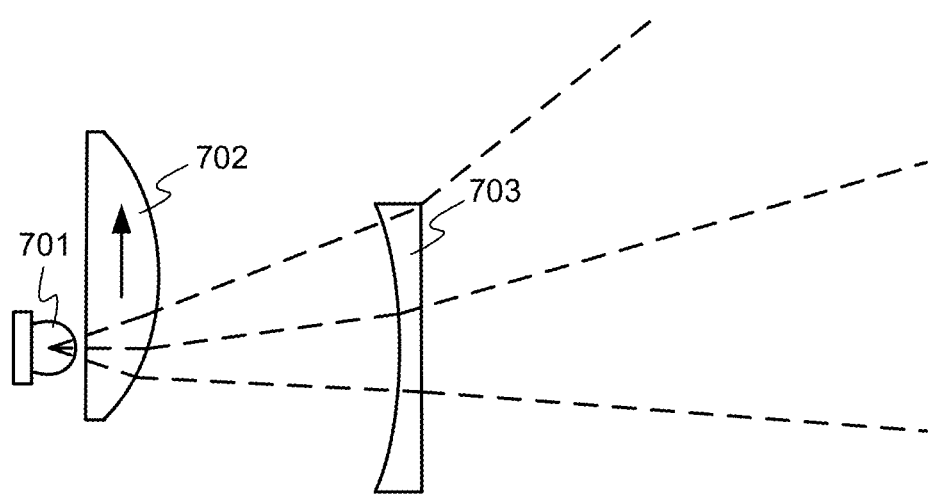

FIGS. 9A-9C illustrate an arrangement similar to that of FIG. 7A, with an additional degree of freedom similar that that shown in FIG. 8C, and that may improve the wide angle performance an illuminator in accordance with embodiments of the invention. In the example configuration of FIG. 9A, LED 701 is positioned approximately at the focal point of the composite lens formed by relatively strong positive element 702 and relatively weak negative element 703, resulting in a narrow illumination field. In the configuration of FIG. 9B, LED 701 and positive element 702 are positioned more closely together while negative element 703 remains in its original position, resulting in a somewhat wider illumination field. In FIG. 9C, positive element 702 has been additionally moved transversely to the optical axis of LED 701, skewing the illumination beam both by the prismatic effect of positive element 702, and further by the prismatic effect of negative element 703.

Figure 10A:
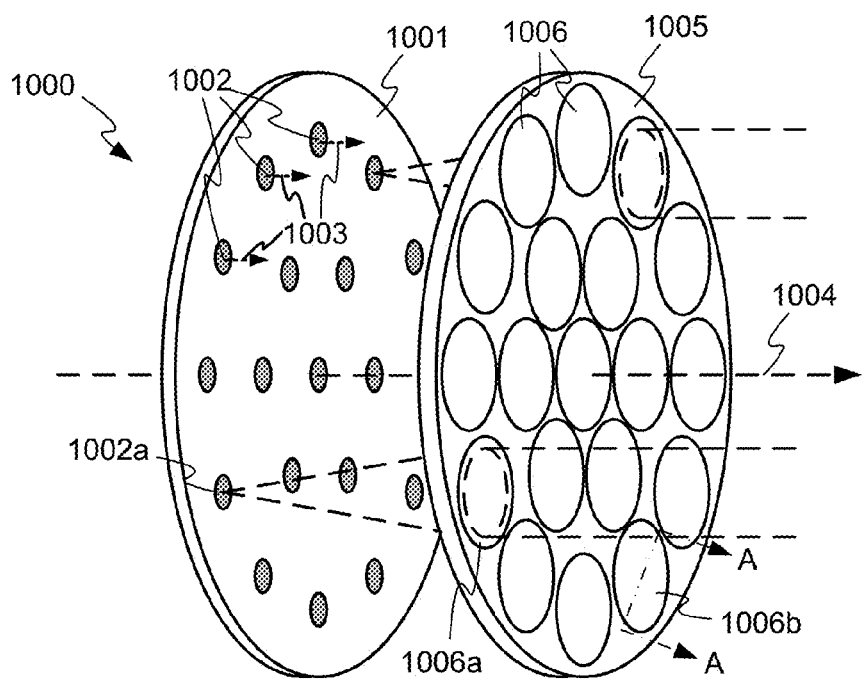
FIGS. 10A and 10B illustrate an illuminator that embodies features and techniques usable in embodiments of the invention.
Figure 10C:
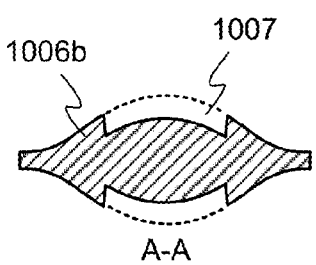
FIG. 10C illustrates a cross section of an example individual lens, in accordance with embodiments.
Figure 10B:
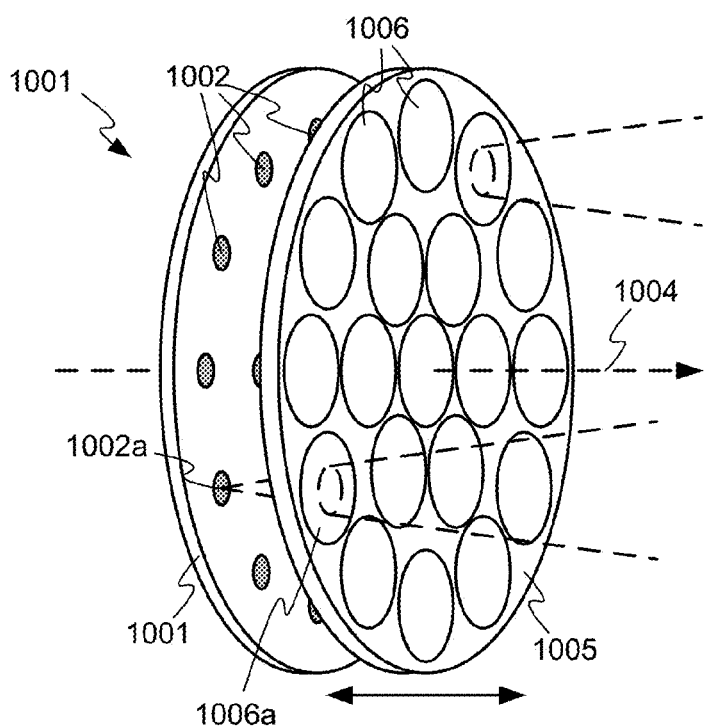

FIGS. 10A and 10B illustrate an illuminator 1000 that embodies features and techniques usable in embodiments of the invention. Example illuminator 1000 operates on a principle similar to that illustrated in FIGS. 5A-5D. In illuminator 1000, an array of LEDs 1002 are mounted to a circuit board 1001. LEDs 1002 may be of any suitable type, for example surface mounted or in packages having leads, and with our without integral lenses. Not all of LEDs 1002 need be of the same type. While an array of 19 LEDs is shown in FIG. 10A, more or fewer LEDs may be used, depending on the particular application the illuminator is intended for, the performance of the LEDs used, and other factors. Illuminator 1000 may also include a power supply, control electronics for driving LEDs 1002, and other elements, but these components are not shown in FIG. 10 so as not to obscure the principles of the invention in unnecessary detail. Circuit board 1001 may also be any suitable type, but may preferably be a metal-core circuit board that effectively cools LEDs 1002.

Each of LEDs 1002 has an optical axis 1003 that defines the principal direction in which the LED emits light, and LEDs 1002 are arranged such that their respective optical axes 1003 are substantially parallel to each other. Illuminator 1000 may also have an optical axis 1004, which may be substantially parallel to the optical axes 1003 of LEDs 1002. LEDs 1002 may be dispersed approximately uniformly across circuit board 1001, or may be clustered more densely in some areas.

Illuminator 1000 also includes a lens plate 1005 positioned immediately in front of the array of LEDs 1002. Here, to be positioned immediately in front of the array of LEDs 1002 means that there are no other optical components between the LEDs 1002 and lens plate 1005 that would affect the field of illumination of illuminator 1000. If any of LEDs 1002 include integral lenses, those lenses are considered to be part of the LEDs, and not additional optical components between the LEDs and lens plate 1005.

Example lens plate 1005 is movable in the direction of the optical axis 1004, so that the distance between lens plate 1005 and LEDs 1002 can be varied. Moving lens plate 1005 while holding
LEDs 1002 fixed is one way of changing the relative positions of lens plate 1005 and LEDs 1002. In other embodiments, the relative positions of lens plate 1005 and LEDs 1002 could be changed by moving LEDs 1002 while holding lens plate 1005 fixed, or moving both lens plate 1005 and LEDs 1002 in a relative manner.

Lens plate 1005 includes a plurality of lenses 1006. In some embodiments, lens plate 1005 includes exactly one lens 1006 for each of LEDs 1002, but other arrangements are possible. For example, one lens 1006 may correspond to a cluster of closely-spaced LEDs mounted together on circuit board 1001. Lenses 1006 may be positive or negative lenses. In some embodiments, lens plate 1005 is a single molded part, and lenses 1006 are formed by variations in the thickness of lens plate 1005. In other embodiments, lens plate 1005 may be assembled from multiple components, including individual lenses 1006. Lens plate 1005 may be molded or otherwise formed of any suitable material, for example polycarbonate, acrylic, or any other polymer or blend of polymers having appropriate optical properties in the wavelengths of interest.

In the embodiment shown in FIG. 10A, lenses 1006 are positive lenses, and lens plate 1005 is positioned such that each of LEDs 1002 is approximately at the focal point of its corresponding lens 1006. That is, the distance between LEDs 1002 and lens plate 1005 is approximately equal to the focal length of lenses 1006. As is illustrated by particular LED 1002a and particular lens 1006a, each lens 1006 produces a relatively narrow beam from the light produced by its corresponding LED 1002. This configuration is similar that that shown for a single LED and lens in FIG. 5A.

FIG. 10B shows illuminator 1000 in a different configuration, in which lens plate 1005 has been moved closer to LEDs 1002. This arrangement is analogous that shown for a single LED and lens in FIG. 5C. In this configuration, each of lenses 1006 produces a diverging beam, and thus so does illuminator 1000. The size of the field illuminated by LEDs 1002 is varied by the position of lens plate 1005.

FIG. 10C illustrates a cross section or an example individual lens 1006b, in accordance with embodiments. To improve the moldability of lens plate 1005, one or more Fresnel steps 1007 may optionally be included, to reduce the thickness of lens 1006b while still providing a positive lens. Many other lens shapes are possible, and not all of lenses 1006 need be of the same shape.

Although not shown, lens plate 1005 could include an array of negative lenses, and could be operated to adjust the illumination field size in a manner analogous to that shown in FIGS. 6A-6D.

Figure 11A:
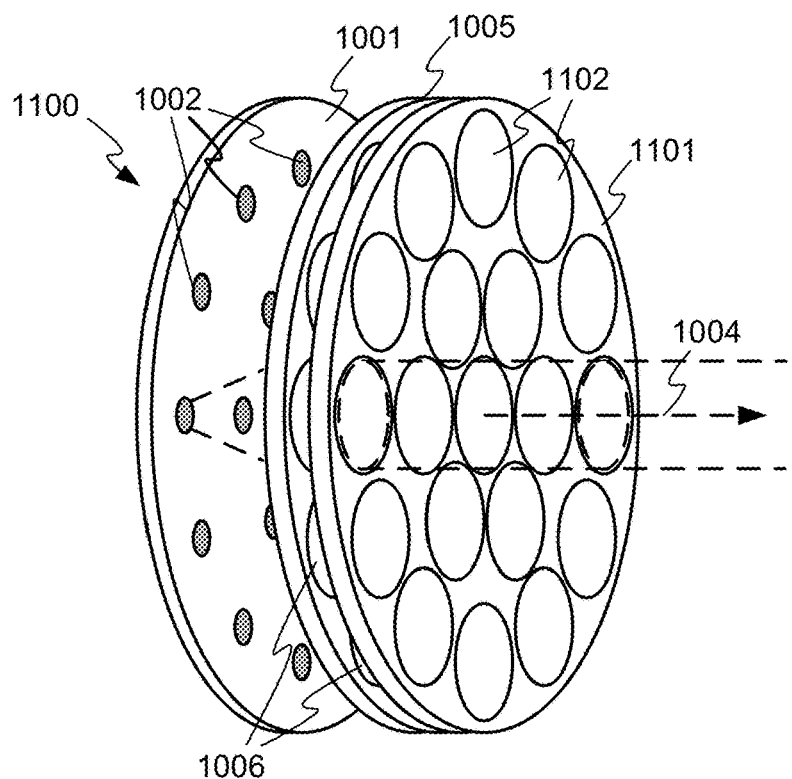
FIGS. 11A and 11B illustrate an illuminator that embodies features and techniques usable in embodiments of the invention.
Figure 11B:
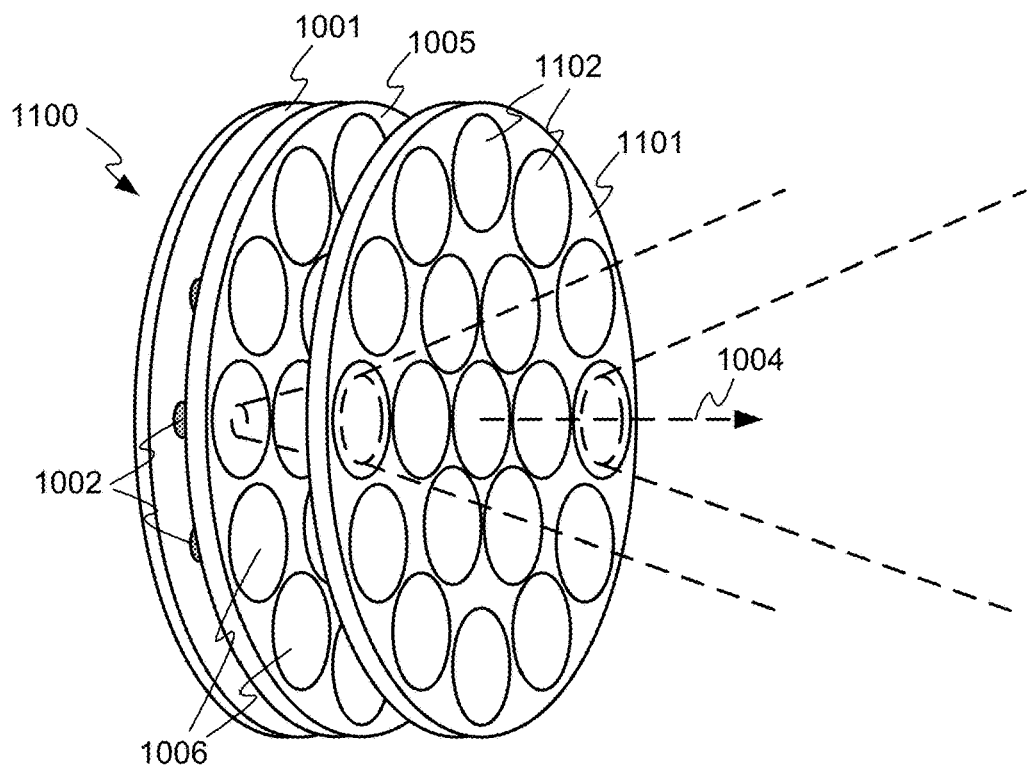

FIGS. 11A and 11B illustrate an illuminator 1100 that embodies features and techniques usable in embodiments of the invention. Example illuminator 1100 operates on a principle similar to that illustrated in FIGS. 7A-7D. Example illuminator 1100 includes a circuit board 1001 and a movable lens plate 1005, similar to those shown in FIGS. 10A and 10B, and also includes a cover plate 1101 in front (further from LEDs 1002) of movable lens plate 1005. Preferably, cover plate 1101 is fixed in position in relation to LEDs 1002, while lens plate 1005 can move in the direction of optical axis 1004. Cover plate 1101 may include a plurality of cover plate lenses 1102, which may be negative lenses. Cover plate 1101 and cover plate lenses 1102 may be integrally formed from a single molded element, or may be assembled from individual components. In FIG. 11A, lens plate 1005 is positioned near cover plate 1101, such that LEDs 1002 are approximately at the focal points of the composite lenses formed by lenses 1006 and 1102. Accordingly, a relatively narrow beam is produced. This arrangement is analogous to that shown for a single composite lens and LED in FIG. 7A.

While the same reference numerals have been used to designate similar elements in the figures, it will be recognized that elements having the same reference numeral need not be strictly identical in all embodiments. For example, each of illuminators 1000 and 1100 includes a lens plate 1005 having lenses 1006, but the curvatures of the surfaces of lenses 1006 need not be identical in the two embodiments. Any of the optical components may be specifically designed for a particular implementation, for example to accommodate particular brands of LEDs, to be compatible with other components of a particular embodiment, or for other reasons.

FIG. 11B shows example illuminator 1100 with lens plate moved closer to LEDs 1002, analogous to the arrangement of FIG. 7C. Accordingly, each lens pair produces a diverging beam, and the combined beams also diverge. The size of the illumination field produced by illuminator 1100 is thus adjustable by adjusting the position of lens plate 1005.

Figure 12A:
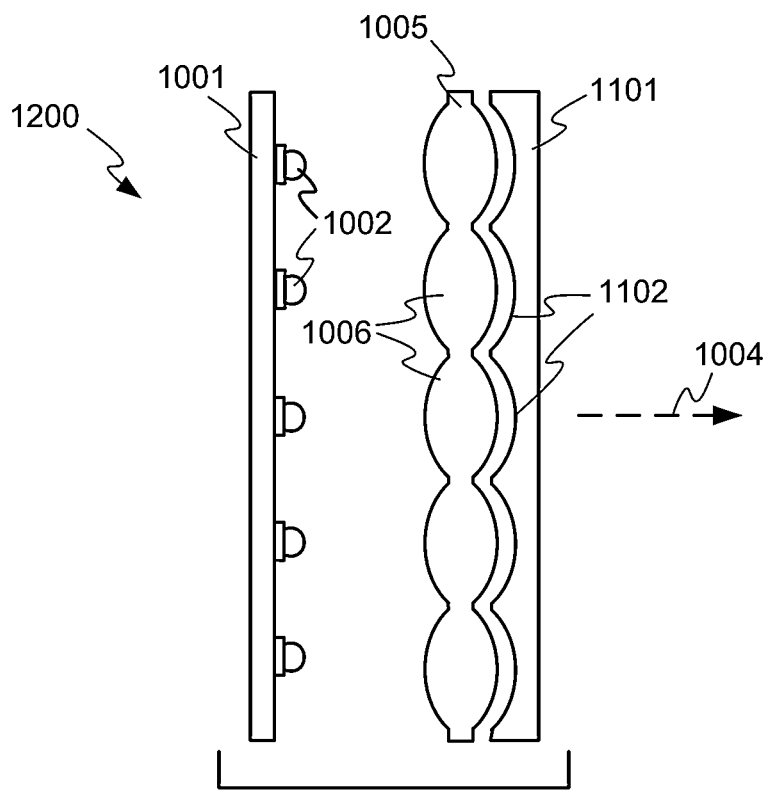
FIGS. 12A-12D illustrate orthogonal views of an illuminator that embodies features and techniques usable in embodiments.
Figure 12B:
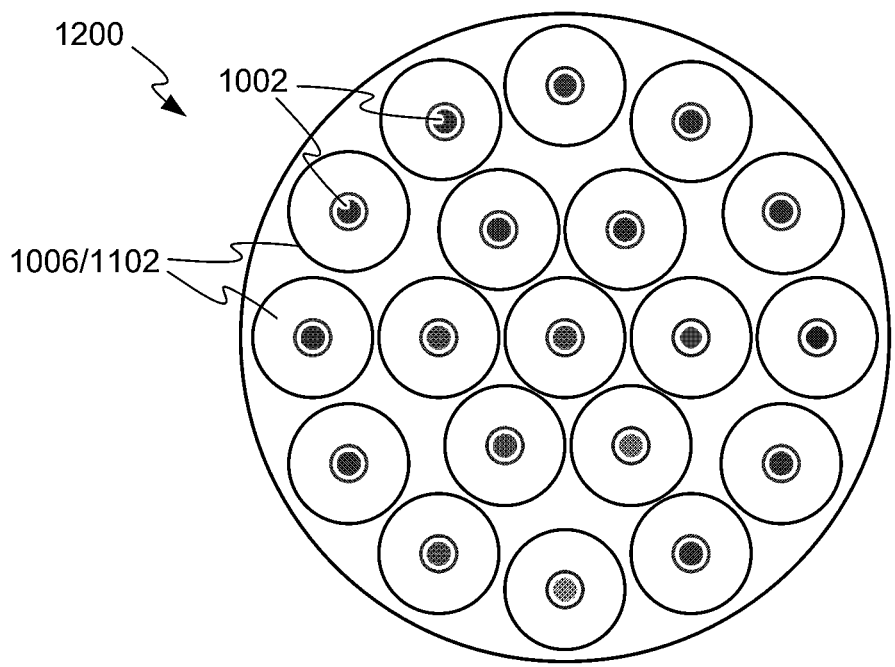

FIGS. 12A-12D illustrate orthogonal views of an illuminator 1200 that embodies features and techniques usable in embodiments. Example illuminator 1200 operates on a principle similar to that illustrated in FIGS. 9A-9C. FIG. 12A is a side view showing circuit board 1001 with an array of LEDs 1002 mounted on it. A lens plate 1005 and cover plate 1101 include lenses 1006 and cover plate lenses 1102, as described above. Illuminator 1200 may have an optical axis 1004. FIG. 12B shows illuminator 1200 as viewed along optical axis 1004, and shows that in this configuration, lenses 1006, cover plate lenses 1102, and LEDs 1002 are aligned.

Figure 12C:
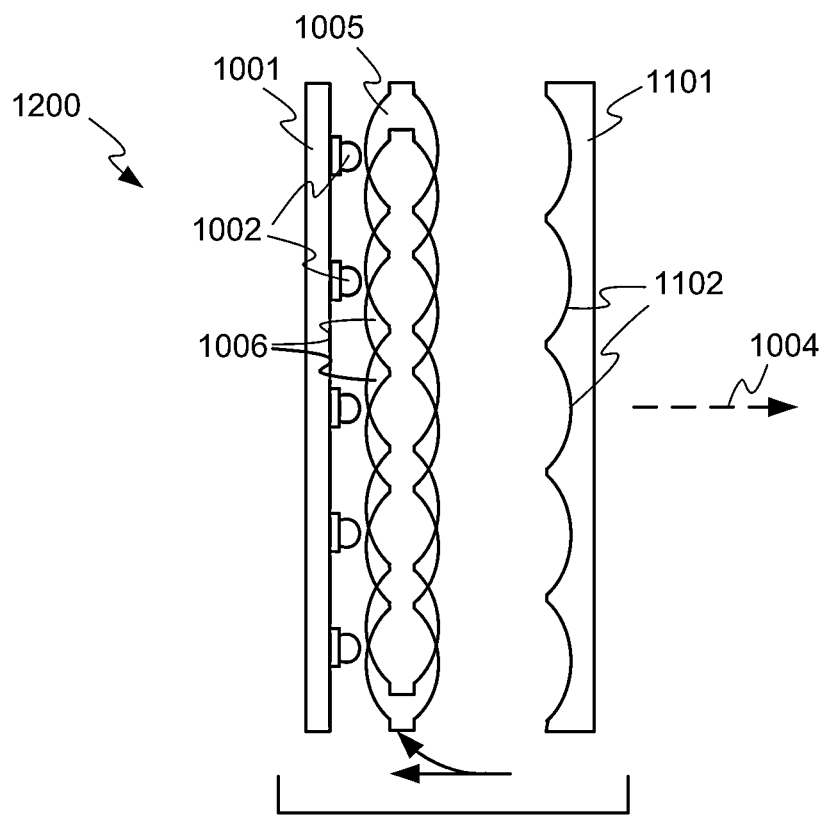
Figure 12D:
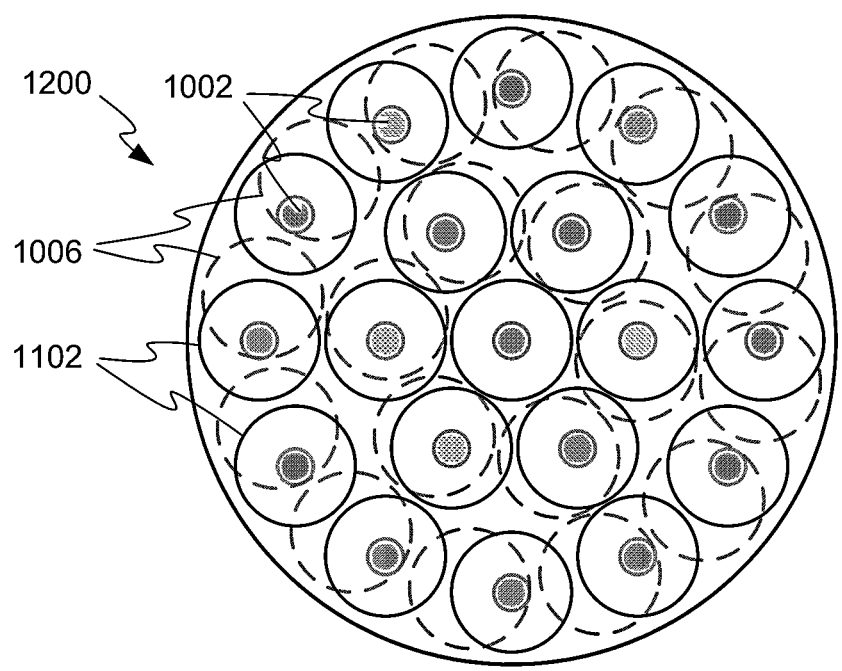

FIGS. 12C and 12D illustrate illuminator 1200 after lens plate 1005 has been moved closer to LEDs 1002, and also rotated about an axis parallel to axis 1004. As is visible in FIG. 12D, lenses 1006 are no longer aligned with LEDs 1002 and cover plate lenses 1102. The translation and rotation of lens plate 1005 may be independent degrees of freedom such that either may be adjusted independently of the other, or may be tied together so that a particular translational position corresponds to a particular rotational orientation. The rotation of lens plate 1005 while holding LEDs 1002 fixed is one way of changing the rotational alignment of lens plate 1005 and LEDs 1002. In other embodiments, the change in rotational alignment could be accomplished by rotating LEDs 1002 while holding lens plate 1005 fixed, or by moving lens plate 1005 and LEDs 1002 in a relative manner.

Figure 13A:
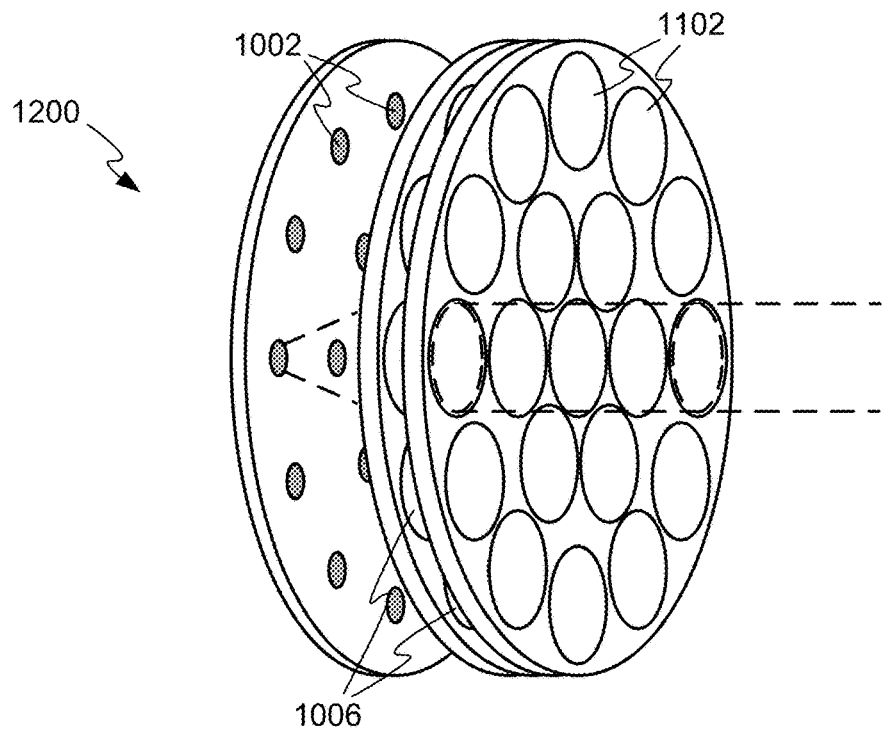
FIGS. 13A and 13B are oblique views of the illuminator of FIGS. 12A-12D.
Figure 13B:
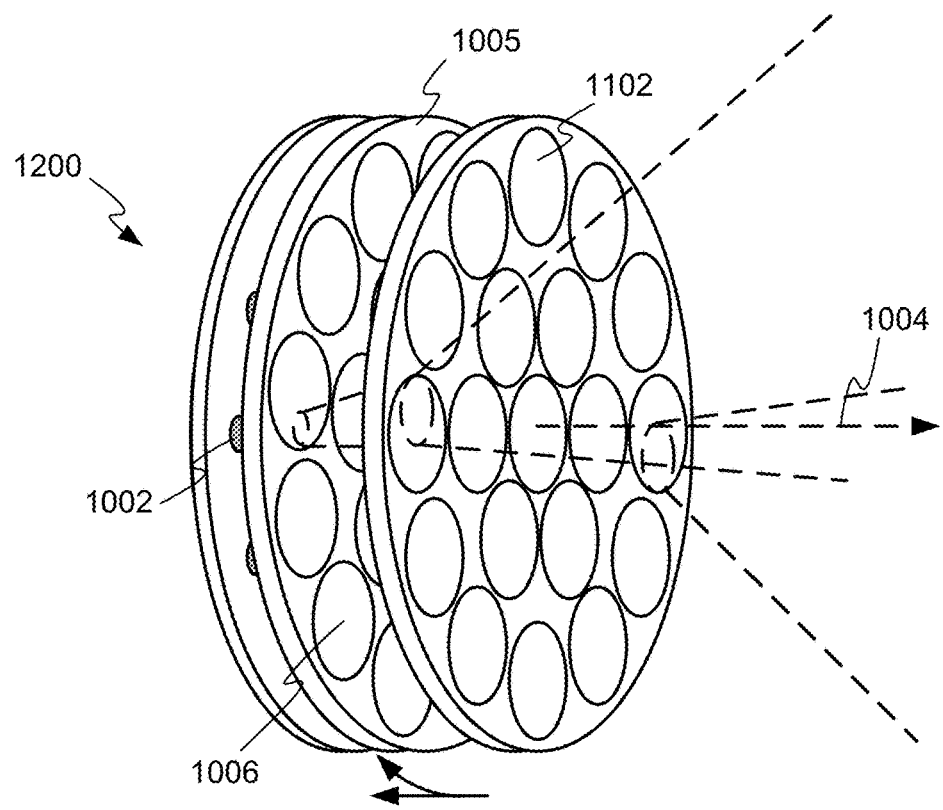

FIGS. 13A and 13B are oblique views of the configurations shown in FIGS. 12A and 12D respectively. As is apparent in FIG. 13A, when LEDs 1002, lenses 1006, and cover plate lenses 1102 are aligned, each LED/lens/cover plate lens combination produces a relatively narrow beam, and therefore so does illuminator 1200. As is visible in FIG. 13B, once lens plate 1005 has been moved toward LEDs 1002 and also rotated, each LED/lens/cover plate lens combination produces a beam that is divergent and also skewed relative to optical axis 1004 of illuminator 1200. Both the divergence and the skew contribute to the broadening of the composite beam produced by illuminator 1200. That is, each beam diverges, and is also "steered" away from the optical axis of illuminator 1200.

In the configuration with a moving positive lens and fixed negative fixed lens, the skewed beam is further skewed by the prismatic effect of the negative lens. Lenses near the center of the array are decentered only a small amount with respect to the LEDs, and so their beam divergence pattern is relatively unaffected. On the other hand, the lenses nearer the outside of the array are decentered significantly from their respective LEDs. This causes their divergence pattern to be skewed off of the optical axis by the prismatic effect of the positive lens array, and then further spread and skewed by the effect of the negative lens array. Since the skewing effect is radially symmetrical about the axis of rotation of the positive lens array plate 1005, the combined effect is a wider total divergence pattern from the illuminator. The combination of the lesser skew of the inner LEDs and the greater skew of the outer LEDs results in a wide illumination pattern without significant voids or "hot spots".

Figure 14A:
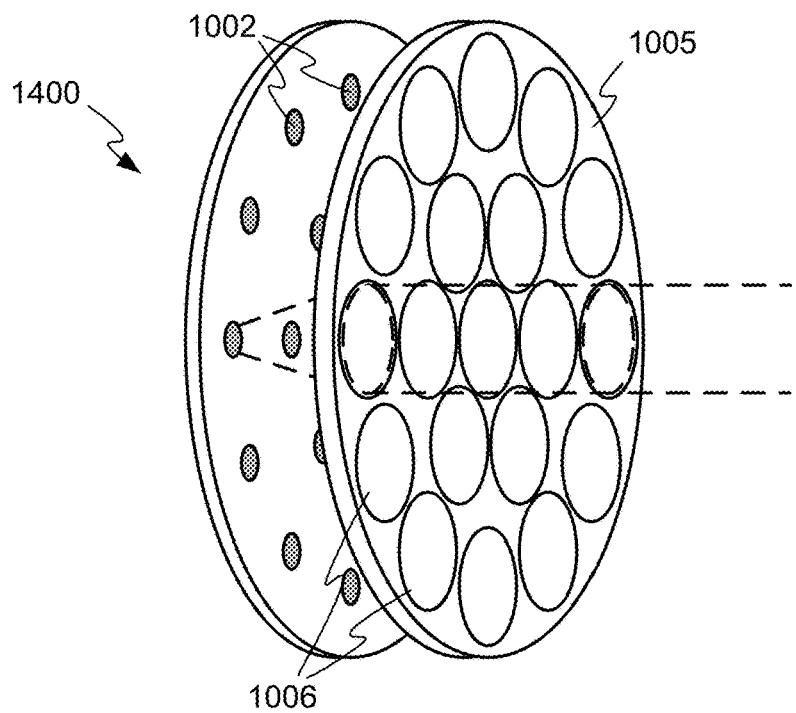
FIGS. 14A and 14B illustrate an illuminator that embodies features and techniques usable in embodiments of the invention.
Figure 14B:
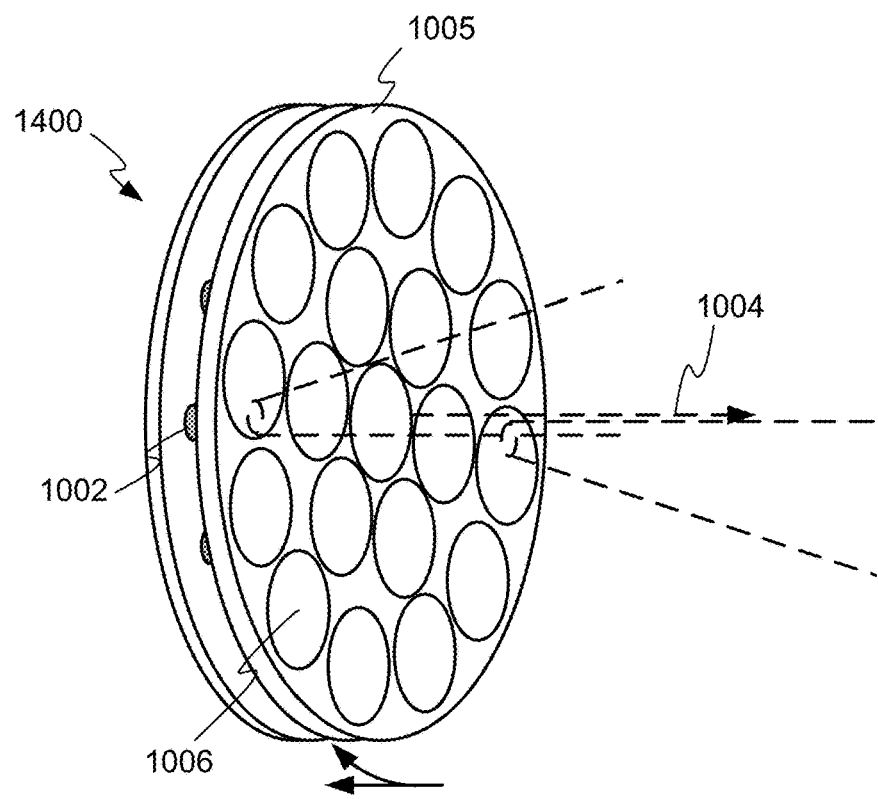

FIGS. 14A and 14B illustrate an illuminator 1400 that embodies features and techniques usable in embodiments of the invention. Example illuminator 1100 operates on a principle similar to that illustrated in FIGS. 8A-8C, and is similar to illuminator 1200, but lacks cover plate 1101. Example illuminator 1400 may be less complex and therefore less expensive to manufacture than illuminator 1200. With careful design of lens plate 1005 and design of the motion of lens plate 1005, illuminator 1400 may perform nearly as well as illuminator 1200.

In FIG. 14A, lens plate 1005 is positioned such that LEDs 1002 are approximately at the focal points of lenses 1006. This position is analogous to that shown in FIG. 8A for a single LED and lens. Accordingly, each LED/lens combination produces a relatively narrow illumination beam, and the combined beam produced by illuminator 1400 is also relatively narrow.

In FIG. 14B, lens plate 1005 has been moved closer to LEDs 1002, and also rotated about axis 1004. This position is analogous to that shown in FIG. 8C for a single LED and lens. As can be seen, the combination of the decreased convergence effect of lenses 1006 and the prismatic effect of lenses 1006 being misaligned with LEDs 1002 causes the beam produced by each LED/lens combination to be divergent and skewed with respect to axis 1004. The divergence of the composite beam produced by illuminator 1400 is adjustable by adjusting the position and rotation of lens plate 1005. As in any of the embodiments shown, the beam is continuously adjustable, although embodiments may be envisioned in which components are positionable only in a limited number of selected positions.

The translation and rotation of lens plate 1005 may be independent degrees of freedom such that either may be adjusted independent of the other, or may be tied together so that a particular translational position corresponds to a particular rotational orientation.

An illuminator according to embodiments may be a varifocal illuminator or a zoom illuminator, and may further include an actuator for moving lens plate 1005. In a varifocal illuminator, any movable components may be set to a particular configuration at installation time, for example to match a particular area to be monitored or to match the field of view of a particular camera having a fixed field of view. Once the correct position is determined, the components may be locked in place. For example, access may be provided to an actuator mechanism including a leadscrew, lever, gears, bearings, or other components for holding and moving lens plate 1006. Locking may be accomplished with a setscrew, clamp, adhesive, or any other suitable mechanism, for example by the inherent friction or static retaining force of the actuator mechanism.

Figure 15:
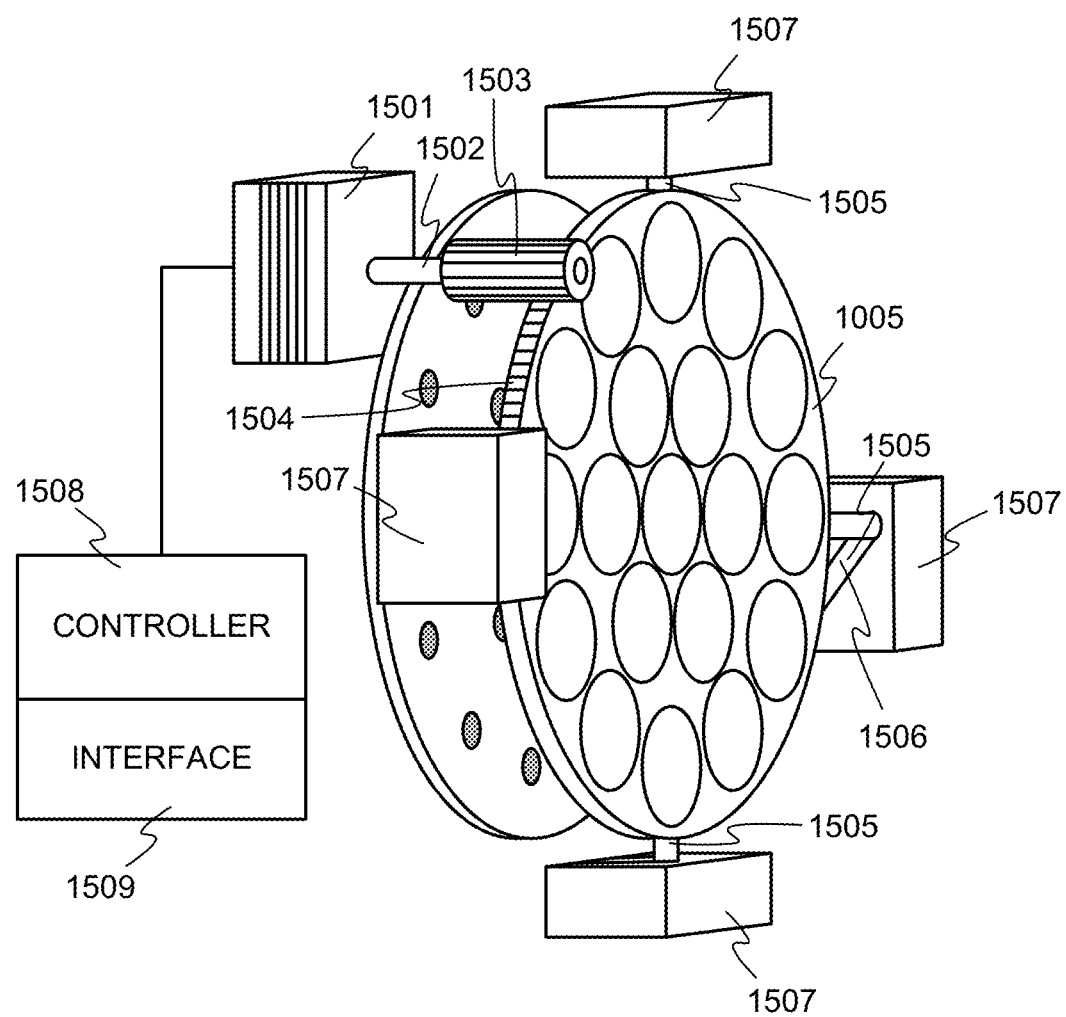
FIG. 15 illustrates an example actuator usable in embodiments of the invention.

In a zoom illuminator, the position of one or more movable components may be adjustable during operation, for example to continuously match the field of view of a camera having a zoom lens. FIG. 15 illustrates one example actuator usable in embodiments of the invention. In this embodiment, a motor 1501 has a shaft 1502 on which a pinion gear 1503 is mounted. Lens plate 1005 also has gear teeth 1504 molded into its peripheral edge, and pinion gear 1503 engages with gear teeth 1504 such that when motor 1501 turns pinion gear 1503, lens plate 1005 also rotates. A number of guide pins 1505 (only three of which are visible in FIG. 15) protrude radially from lens plate 1005, and engage angled grooves 1506 (only two of which are visible in FIG. 15). For example, angled grooves 1506 may be formed in features 1507 within a housing (not shown) that encloses the elements shown in FIG. 15. As lens plate 1005 rotates, guide pins 1505 track in angled grooves 1506 and cause lens plate to also move toward or away from LEDs 1002. This is an example of a mechanism in which translation and rotation of lens plate 1005 are tied together. Motor 1501 may be controlled and driven by a controller 1508. Motor 1501 may be a stepper motor, DC motor, AC motor, a solenoid and ratchet, or any other suitable kind of motor. Additional gearing may be present, for example for increasing the torque applied to lens plate 1005 and for providing a holding force to retain lens plate in a particular position when motor 1501 is not energized. Many other kinds of actuators may be utilized in embodiments.

Controller 1508 may be microprocessor-based, and may be specially programmed or otherwise configured to control various functions of an illuminator according to embodiments. For example, controller 1508 may include a communications interface 1509, for receiving commands and returning status information to a remote control center, as is described in more detail below.

Figure 16:
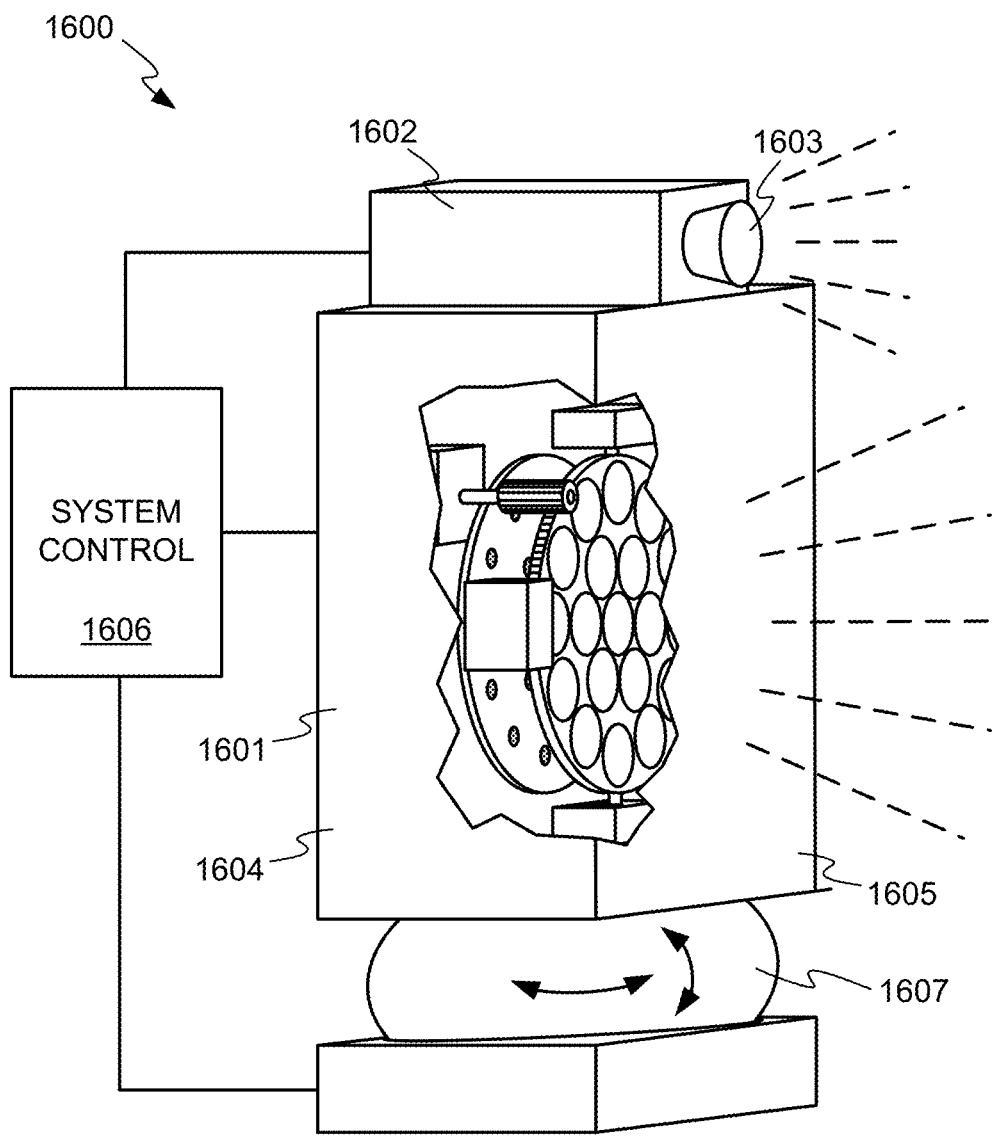
FIG. 16 illustrates a system in accordance with another embodiment of the invention.

FIG. 16 illustrates a system 1600 in accordance with other embodiments of the invention. In system 1600, a variable focus illuminator 1601 is used in conjunction with a camera 1602. In some embodiments, camera 1602 may have a fixed field of view, and variable focus illuminator may be a varifocal illuminator set to produce a fixed illumination field compatible with the field of view of camera 1602. However, in other embodiments such as the embodiment shown in FIG. 16, camera 1602 comprises a zoom lens 1603 such that the field of view of camera 1602 can be varied. In that case, variable focus illuminator 1601 preferably also includes a zoom capability with an automatic actuator such as the actuator of FIG. 15 as shown.

Variable focus illuminator 1601 may be enclosed in a housing 1604 having a front face 1605 that is substantially transparent to light from LEDs 1002. When infrared LEDs 1002 are used, front face 1605 need not be transparent to visible light, so that the inner workings of variable focus illuminator may be hidden from view. If an illuminator having a cover plate with cover plate lenses is used, for example illuminator 1100, front face 1605 may conveniently serve as the cover plate, and may have the cover plate lenses integrally molded into it. In some embodiments, camera 1602 may also be enclosed by housing 1604.

A system controller 1606 may be used to control variable focus illuminator 1601. System controller 1606 may be, for example, located at a remote monitoring center where an operator or computer can direct the settings of variable focus illuminator 1601, such as the on/off state or power level of the LEDs, the angle of illumination, or other settings. System controller 1606 may both send commands and also receive information back from illuminator 1601. Information received from the illuminator can include ambient light level, power supply voltage or current, or internal or external temperatures, for example. System controller 1606 may communicate with variable focus illuminator 1601 and camera 1602 by any suitable interface, for example, Ethernet, USB, Firewire, RS-232, RS-422, or any other standard or proprietary interface or interfaces System controller 1606 may also control both camera 1602 and variable focus illuminator 1601 such that they work compatibly together. System controller 1606 may be, for example, located at a remote monitoring center where an operator can direct the motions and zoom settings of variable focus illuminator 1601 and camera 1602, either separately or together. System controller 1606 may send commands and also receive information back from camera 1602, for example the image of video data produced by camera 1602, diagnostic information about variable focus illuminator 1601 or camera 1602, or other information. Many different arrangements are possible.

Both variable focus illuminator 1601 and camera 1602 may be mounted on a pan/tilt mechanism 1607, which may also be controlled by system controller 1606.

The control mechanism for variable focus illuminator 1601 may be logically or physically separate from the camera control mechanism. It could also advantageously be integrated with the camera control. For example, an operator may have a single control lever or software slider which simultaneously modifies the camera zoom setting along with the illuminator's angle of coverage. As another example, a computer program may automatically point and zoom the camera at a target of interest, while simultaneously zooming the illuminator. In some embodiments, the illuminator control signals could also be "piggy-backed" on the camera's video interface, as is sometimes done with PTZ control signals.

In addition to providing control signals remotely from an operator or control computer, it is possible for the illuminator to receive its control signals directly from the camera or pan/tilt controller. When the camera is instructed to change its zoom lens setting, the camera or PTZ controller could instruct the illuminator to change its angle of illumination. The control information could be transmitted from the camera or PTZ to the illuminator via any of the means described above. It is also possible for the illuminator to detect ("eavesdrop" on) the control signals being sent to the camera. In other words, when an operator or control computer sends a signal to the camera to change its lens setting, the illuminator could listen and respond to the camera control message by changing its angle of illumination to match. This has the advantage that no additional control hardware, software, or wiring infrastructure is required to support the zoom capability of the illuminator. In other words, the illuminator could be added to the zoom camera installation with minimal integration effort.

Having an interface to the zoom illuminator, either connected back to a monitoring center or connected to the camera or PTZ controller, allows other status monitoring and control functions in addition to controlling the illumination angle. For example, the interface could be used to remotely control when the illuminator is on or off, or to control the power level of its output. It can be used to remotely monitor characteristics of the illuminator and its environment, such as its input voltage, current, power level, temperature, output light level, ambient light level. It could also be used to remotely monitor the "health" of its internal components. It may be quite beneficial to remotely run diagnostics, or to sense a failure or potential for failure of the illuminator.

In some embodiments, illuminator 1601 may have stored within it a number of "presets". These are combinations of settings, such as field of illumination and light power level, which can be recalled by issuing single commands from the system controller 1606. For example, illuminator may include a controller similar to controller 1508, including a communications interface 1509 for communicating with system control 1606, and configured to control various aspects of the operation of illuminator 1601. System control 1606 may send a single command instruction illuminator 1601 to recall one of the presets, and controller 1508 may then adjust illuminator 1601 to conform to the preset. While presets stored in illuminator 1601 may be addressed independently, it is particularly advantageous for the illuminator presets to match specific camera and/or pan/tilt presets, such that issuing the preset commands for a pan/tilt position, a camera zoom setting, and an illuminator angle and power setting are all well-matched. As described above, it is possible for the illuminator to detect (eavesdrop on) preset commands being sent to camera 1602 and/or pan/tilt/zoom mechanism 1607. Thus a single command may invoke the desired settings for camera, pan/tilt mechanism, and illuminator. As described above, this has the advantage that no additional control hardware, software, or wiring infrastructure is required to support the zoom capability of the illuminator.

In the illuminators described above, light of only a single color is used, for example white or infrared light. According to embodiments of the invention, a variable focus illuminator may include multiple kinds of light sources emitting light of different colors (comprising different bands of wavelengths). For example, the illuminator may contain light sources that emit white light, and sources that emit infrared light. A lens array similar to those described above is positioned in front of the light sources, and the system is arranged such that light of either color can be focused into a narrow beam or spread into a wider illumination field by controlling the relative positions of the light sources and the lens array. Such an illuminator may be referred to as a multi-spectral variable focus illuminator.

Multi-Spectral Illuminator

Figure 17:
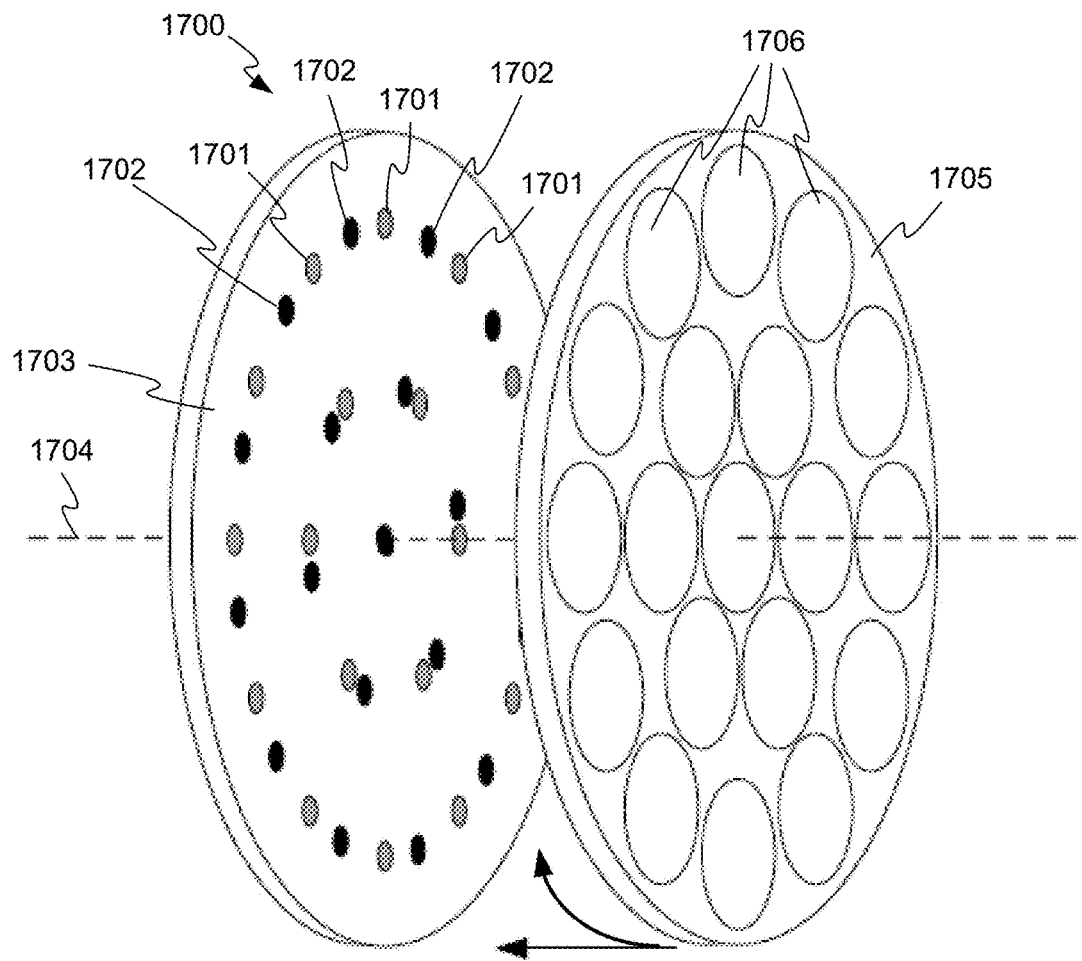
FIG. 17 illustrates a portion of a multi-spectral variable focus illuminator according to embodiments of the invention.

FIG. 17 illustrates a portion of a multi-spectral variable focus illuminator 1700 according to embodiments of the invention. Two sets of light sources 1701 and 1702 (only some of which are labeled in FIG. 17) are mounted to circuit board 1703. Light sources 1701 and 1702 may be, for example, light emitting diodes or other kinds of light sources. When energized, light sources 1701 emit light in a first band of wavelengths (light of a first color), and light sources 1702 emit light on a second band of wavelengths (light of a second color) different from the first. The wavelength bands may be narrow or wide. For example, one set of light sources may emit monochromatic or essentially monochromatic light, or may emit light in a comparatively broad spectrum. In some embodiments, one set of light sources may emit light in a broad range of the visible spectrum, also known as "white" light, while the second set of light sources emits infrared light. For the purposes of this disclosure, the visible spectrum encompasses wavelengths from about 400 to about 700 nm, and infrared light includes wavelengths longer than 700 nm. White light enables discrimination of color in the scene being imaged. In other embodiments, the two sets of light sources may emit different ranges of infrared light, for example light at about 850 nm suitable for semi-covert surveillance, and light at about 940 nm, which is invisible to the human eye and therefore suitable for covert surveillance.

Preferably, the light sources are arranged about an optical axis 1704 of the illuminator. While each of light sources 1710 and 1702 is shown as a single element, it will be recognized that clusters of closely-spaced multiple sources may be used as well.

A lens plate 1705 is positioned in front of the light sources, and includes an array of lenses 1706, only a few of which are labeled in FIG. 17. As before, lens plate 1705 may be a monolithic plate into which lenses 1706 are molded. Alternatively, the array of lenses 1706 may be assembled from individual lenses and other parts. In the example of FIG. 17, the array of lenses 1706 is movable with respect to circuit board 1703, but it will be recognized that the relative positions of the light sources and lenses could also be changed by moving circuit board 1703, or moving circuit board 1703 and lens plate 1705 in concert. Lens plate 1705 is preferably movable in translation, parallel to optical axis 1704, and also in rotation about optical axis 1704.

Lenses 1706 are arranged in a pattern that matches the pattern of light sources 1701, and also matches the pattern of light sources 1702. That is, lenses 1706 can be positioned such that one of lenses 1706 is positioned over each of light sources 1701, or such that one of lenses 1706 is positioned over each of light sources 1702. The patterns of light sources 1701 and 1702 may be substantially identical and offset rotationally with respect to each other, with the possible exception that only one light source may be positioned at the center of the array. In other embodiments, not all of the light source locations depicted in FIG. 17 may be populated. For example, the outer ring of light sources may include both kinds of light sources, while the inner ring may include only one of the two kinds This may be done, for example, to balance the power available from the different kinds of sources, to improve the evenness of illumination provided by one of the sets of light sources, or for other reasons.

Figure 18A:
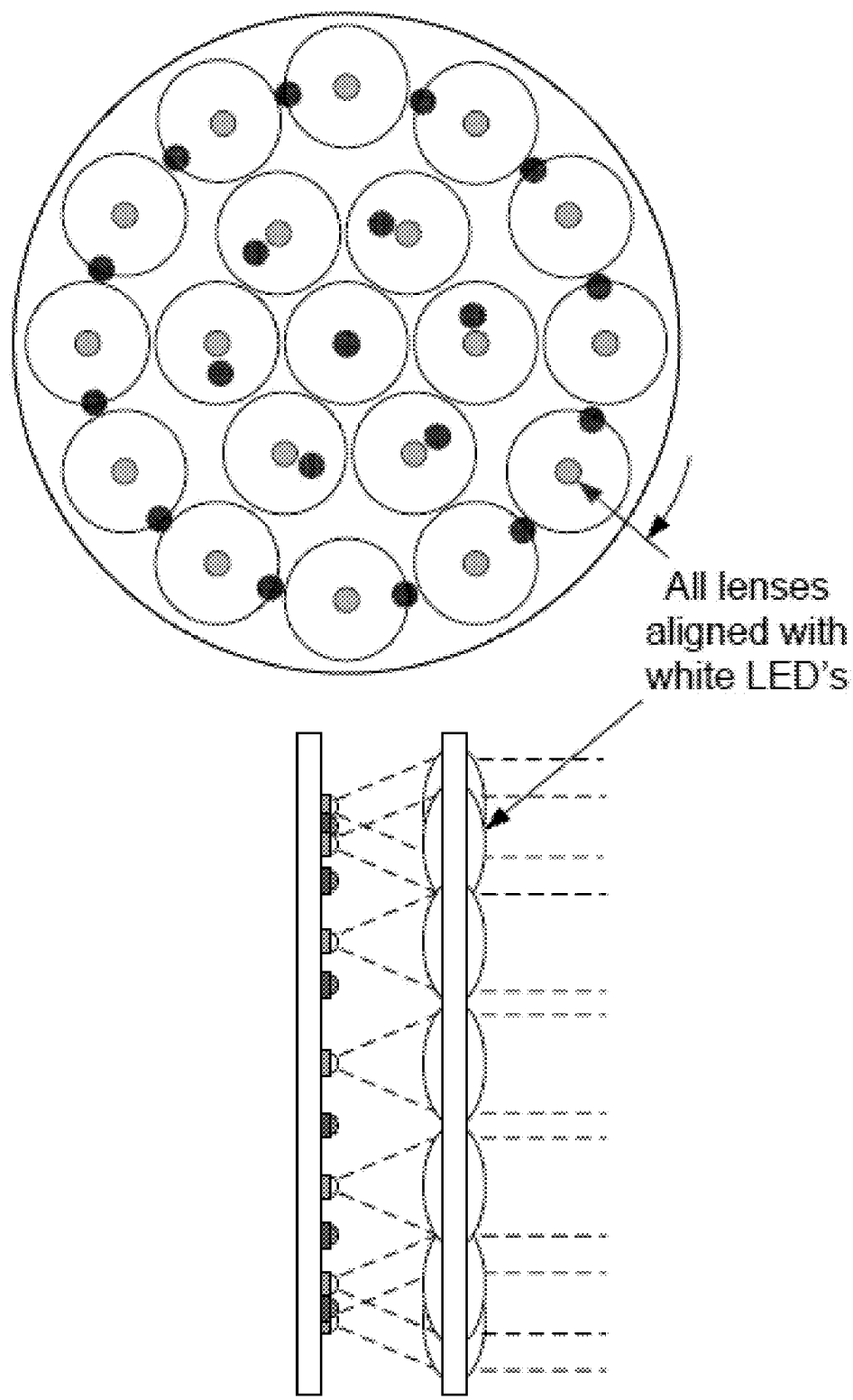
FIGS. 18A and 18B show two configurations of the components of FIG. 17.
Figure 18B:
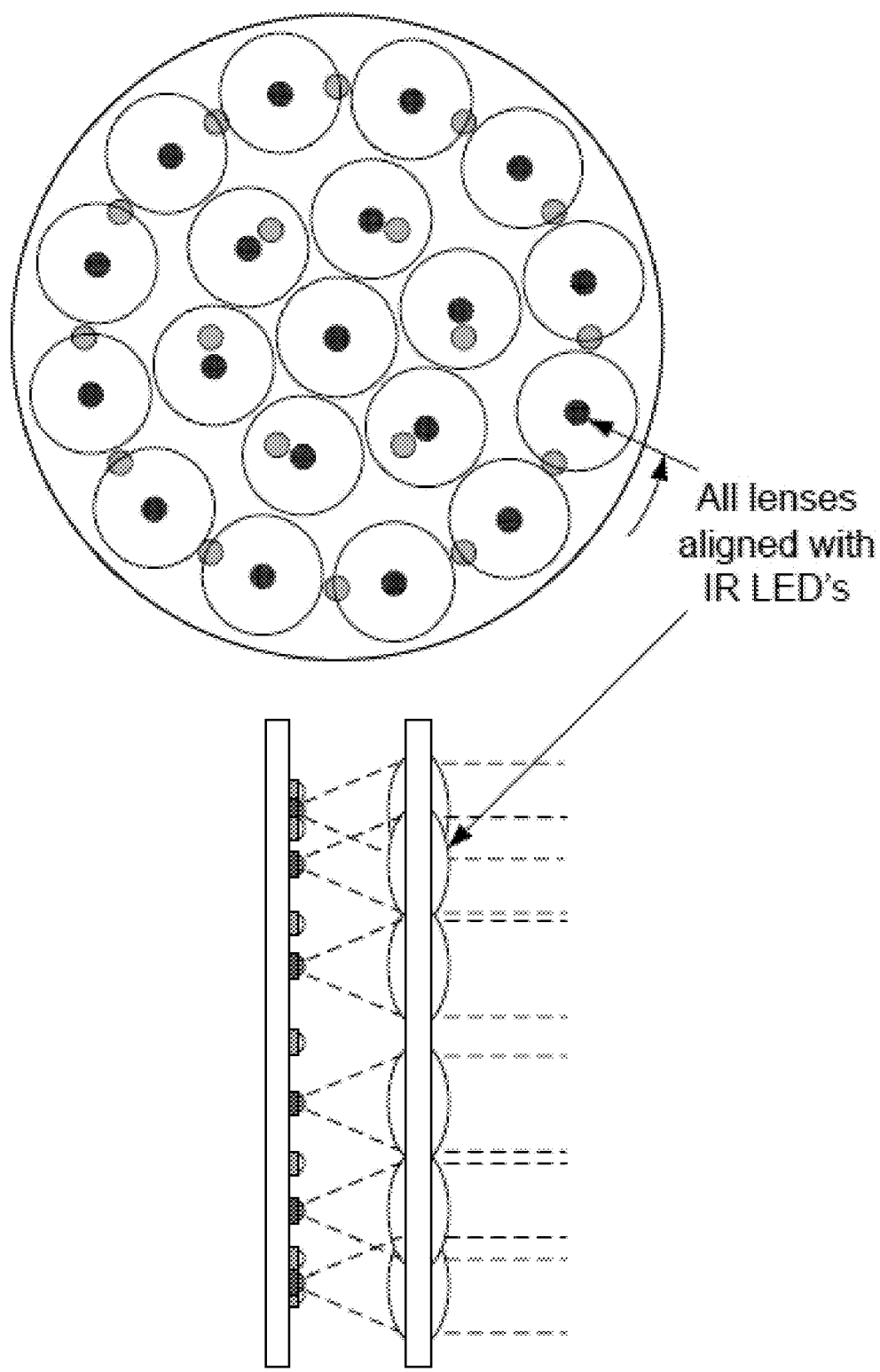

Assuming for the sake of example that light sources 1701 are white light emitting diodes (LEDs) and light sources 1702 are infrared (IR) LEDs, when the lens array is placed with the white LEDs at the lenses' focal points and the white LEDs are energized, the illuminator will generate a narrow, focused beam of white light, as illustrated in FIG. 18A. When the lens array is rotated such that the IR LEDs are at the lenses' focal points, and the IR LEDs are energized, the illuminator will generate a narrow, focused beam of IR light, as illustrated in FIG. 18B.

In the single color variable illuminator discussed above, a wide composite beam pattern is generated by rotating and translating the lens array such that the beams are defocused and fanned outward. The same can be accomplished in a multi-spectral variable focus illuminator. The motion of the lens array can include a position of narrow focus for the IR light and a position of narrow focus for the white light as described above, as well as positions where the lens is rotated and defocused with respect to either the IR or white LED arrays, as shown in FIGS. 19A-19D.

Figure 20A:
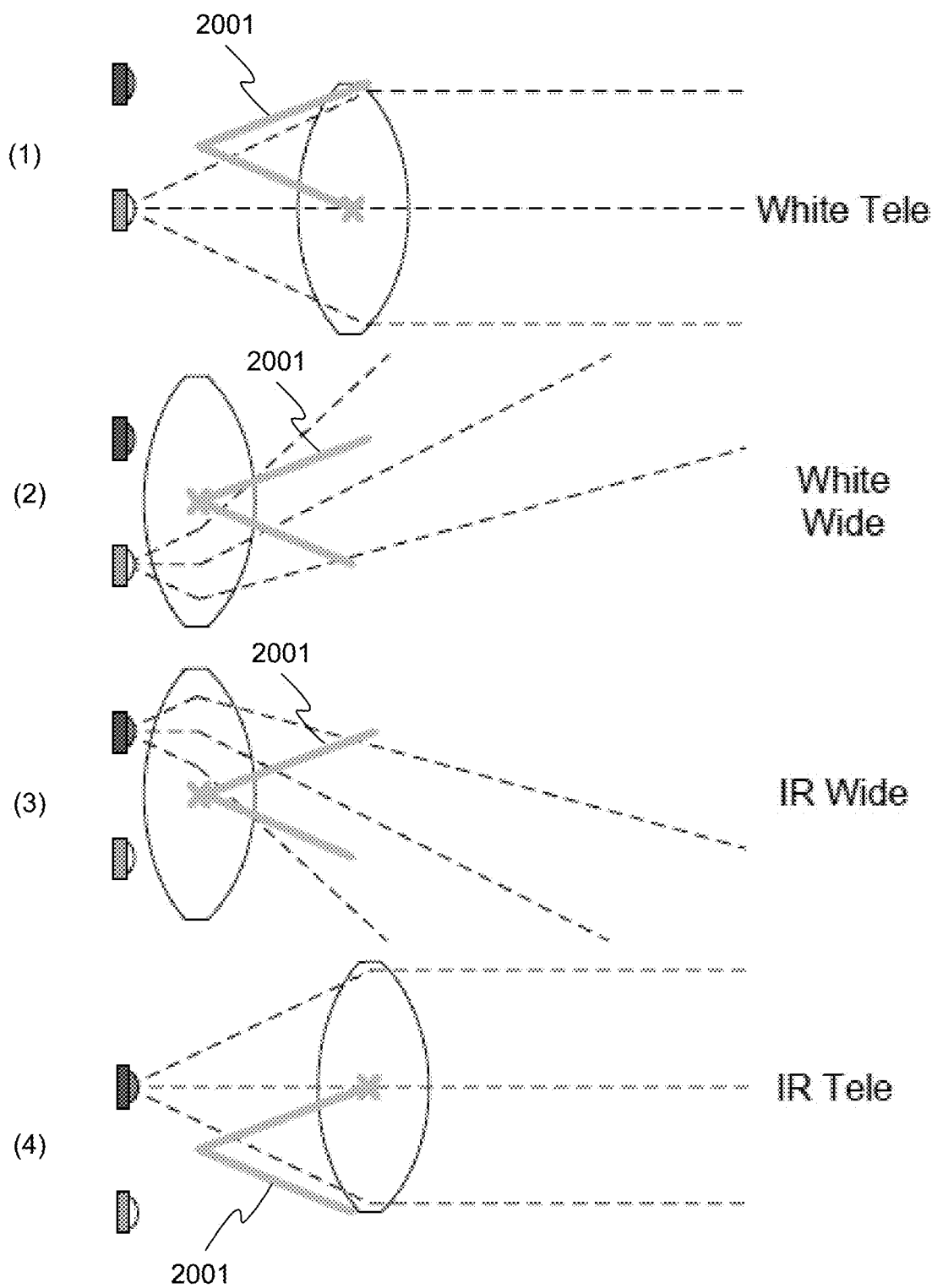
FIGS. 20A and 20B show two lens motions for generating wide angle and narrow angle illumination from two different light sources, in accordance with embodiments of the invention.
Figure 20B:
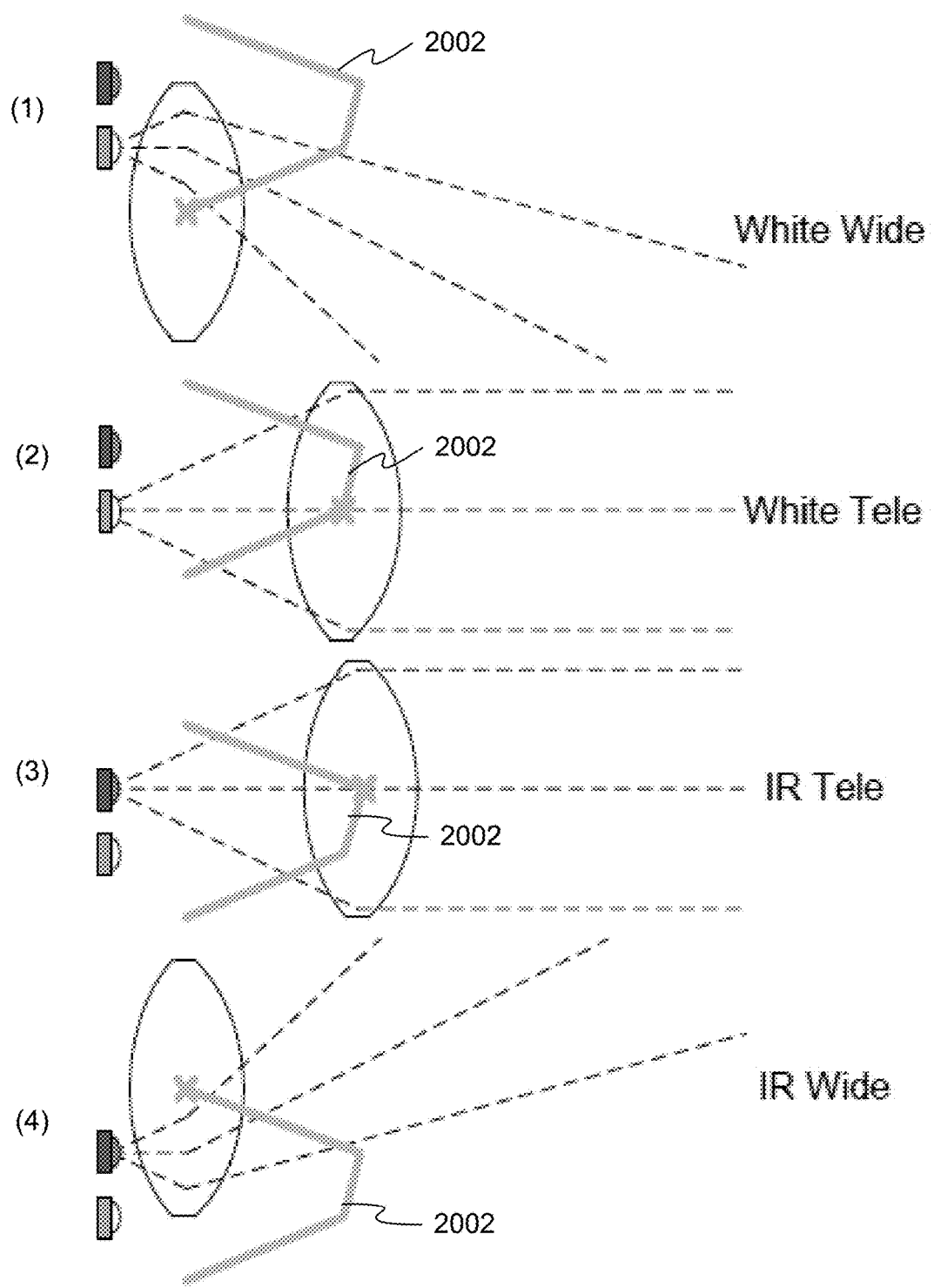

FIGS. 20A and 20B show two possible LED configurations and lens array motions that provide wide and narrow beams of both light source colors. In one case shown in FIG. 20A, the IR and white focused (tele) positions define the two end points of the path 2001 traveled by the lens with respect to its corresponding light sources. Between these points, the lens moves closer to the LEDs. At the close-in point or points, the light from either the IR or the white LED array is defocused and skewed, providing a wide illumination pattern of either IR or white light, depending on which set of LEDs is energized. In this example configuration, as the lens moves from one extreme of travel to the other it passes through a range of positions that includes in order (1) a position that results in light from the corresponding white LED being directed into a narrow beam, (2) a position that results in light from the white LED being directed into a diverging beam, (3) a position that results in light from the corresponding IR LED being directed into a diverging beam, and (4) a position that results in light from the IR LED being directed into a narrow beam. In some embodiments, positions (2) and (3) may be the same.

In the second configuration, shown in FIG. 20B, the IR and white LEDs are spaced closely together. The lens moves from the position of best focus for the IR array to the point of best focus for the white light array, both near the center of travel. From these points, the lens moves closer to the LED while rotating away from the axes of the LED. In this case, the extremes of travel represent the wide angle positions for the two wavelengths. That is, in this example, as the lens moves from one extreme of travel along path 2002 to the other it passes through a range of positions that includes in order (1) a position that results in light from the corresponding white LED being directed into a diverging beam, (2) a position that results in light from the white LED being directed into a narrow beam, (3) a position that results in light from the corresponding IR LED being directed into a narrow beam, and (4) a position that results in light from the IR LED being directed into a diverging beam.

For the purposes of this discussion, a "narrow" beam is the beam having the minimum divergence angle attainable by the illuminator with the light sources in use, and a "diverging" beam is the beam having the maximum divergence angle attainable by the illuminator with the light sources in use. Due mainly to the variation of the index of refraction of many materials with wavelength, the divergence angle of the narrow beam from one set of light sources may not be exactly the same as the divergence angle of the narrow beam from the other set of light sources. Similarly, the divergence angle of the diverging beam from one set of light sources may not be exactly the same as the divergence angle of the diverging beam from the other set of light sources.

It will also be recognized that the distance from the LED to the lens may be different for the IR and the white LEDs when at their respective focused (tele) positions. This is also due to the difference in refractive index of most materials at different wavelengths. This effect may be compensated for in the path of the lens, so the beam width can be optimized for each wavelength. The wide angle position in both rotation and distance from the LEDs may be different for both IR and white light. This may provide more uniform wide patterns for each source.

In the examples of FIGS. 20A and 20B, a single multi-segment path combining rotation and translation can cover the full range of illumination angles for both the white and IR LEDs. This means that a single motor or actuator can be used to drive the lens array through this motion path. The lens array is constrained to follow only this path. One approach is to use a cam mechanism, which may include pins or similar features around the perimeter of the lens array to engage groove features in the illuminator housing. This is similar to the mechanism used to generate the complex motion of lens group in a zoom photographic lens. Rather than molding or machining grooves in the housing itself, it may be advantageous to design separate bearing blocks to guide the motion of the lens array, similar to blocks 1507 shown in FIG. 15, but having grooves with increased complexity of curvature. These blocks may be molded with complex features, and can be made of low friction materials. The path of lens motion is directly defined by the grooves or other features molded or machined into the housing or the dedicated bearing blocks.

In the examples of FIGS. 20A and 20B, the lens paths are piecewise linear. This means that the lens will move towards the lens by the same increment for each increment in rotation away from the optical axis of the corresponding LED. Intermediate positions between wide and tele thus provide any number of intermediate illumination angles between those extremes. In other embodiments, it may be advantageous to define a curved path between wide and tele in order to optimize the illumination pattern at these intermediate positions. For example, it may be better to defocus faster than to fan out or skew the illumination pattern as the lens moves away from tele. In that case the path will be steeper at this point, and will become shallower (more rotation than translation) as the lens moves toward the wide angle position. Both the IR and the white lens travel paths can be optimized independently since they are defined by separate segments of the full composite path of the lens.

In other embodiments, more than two kinds of light sources may be used. For example, an illuminator may include LEDs that emit light at about 940 nm, LEDs that emit light at about 850 nm, and LEDs that emit white light. The three kinds of light sources may be mounted to a single circuit board such as circuit board 1703, in similar patterns that are displaced rotationally from each other. Sufficient travel would be provided in the rotation of the lens plate to encompass all three light source patterns.

In some embodiments, a system including a multi-spectral variable focus illuminator may include a controller programmed or otherwise configured to perform operations that take advantage of or facilitate the capabilities of the multi-spectral variable focus illuminator.

For example, when instructed to switch from IR to white light, the illuminator controller can automatically move the lens array to the appropriate position such that the illumination angle of white light matches the previous IR illumination angle. As another example, the controller could switch from IR to white mode based on an external event, such as a signal from a motion detector, or from an analytics processor in a camera or a remote computer. As another example, the two light sources may be controlled by the signal from an internal or external photocell. At dusk, the white LEDs could be energized to extend color video surveillance, and then the illuminator may switch to IR illumination at dark to reduce light pollution and switch to covert surveillance. Similarly, the respective power levels of the IR or white illumination may be set in response to any combination of ambient light level, time, or external trigger source. In another example, the system may be operating in a covert or semi-covert mode using IR illumination, but may switch to white light to deter or identify an intruder.

It is to be understood that a multi-spectral illuminator may incorporate any workable combination of the features described above with respect to a single-color illuminator. For example, a cover plate such as cover plate 1101 may be used in a multi-spectral illuminator, and may include additional lenses. In another example, a drive system as shown in FIG. 15 may be used to move a lens plate such as lens plate 1705 in a multi-spectral illuminator, including gear teeth on a peripheral edge of the lens plate, driven by a pinion gear.

In addition, a multi-spectral illuminator may be integrated into a system such as system 1600 shown in FIG. 16, and may work in concert with a pan-tilt-zoom (PTZ) camera system. For example, a system controller may eavesdrop on signals sent to the camera or otherwise learn the zoom setting of the camera, and instruct the illuminator to adjust its beam width, power setting, or other parameters to match the field of view of the camera.

In some embodiments, a multi-spectral variable focus illuminator may be provided with a number of preset configurations, in which such parameters as illumination field size, power, which set of light sources is used, or other settings may be specified. The system controller may store the preset configurations so that each is recallable with a single command. For example, a table of preset configurations may appear as follows:

| Preset Configuration Number | Illumination Type | Zoom Setting | Power Level | Comments |
|---|---|---|---|---|
| 1 | IR | 100 | 100 | IR Distance |
| 2 | IR | 0 | 100 | IR Flood |
| 3 | IR | 0 | 33 | IR Low Power Monitor Mode |
| 4 | White | 100 | 100 | Deter/ID Intruder |
| 5 | White | 0 | 100 | White Flood |
| 6 | White | 0 | 33 | White Low Power Monitor |

Once a preset configuration is recalled, the illuminator immediately configures itself or reconfigures itself to conform to the parameters corresponding to the preset configuration.

It will be recognized that many other preset configurations may be defined. For example, certain presets may be used with certain pan-tilt-zoom settings, such as for periodic scanning of doors, gates, or other areas of particular interest.

Preferably, the power supplied to the light sources is independently controllable. That is, the power supplied to the IR light sources when they are used is controllable, and the power supplied to the white light sources when they are used is controllable, and the power settings are independent of each other, so that when a switch is made from IR to white illumination or vice versa, the power setting after the switch is not necessarily the same as the power setting before the switch.

In another example, a combined IR and white illuminator could be instructed by the PTZ controller or the camera to switch from white to IR when the camera switches from day to night mode, i.e. when it removes its IR cut filter from in front of its lens.

An illuminator controller may also contain circuitry and algorithms to protect the illuminator from damage, or to enhance its reliability. For example, it could reduce the LED power level at high temperature. It could also reduce the power level if the input voltage sags, which could reduce efficiency or even cause damage to the illuminator or the power supply. Damage to the mechanics can occur if the lens is instructed to move continuously, especially at high temperature. The controller can limit the frequency of motion under these conditions.

The controller may include a communications interface for controlling the illuminator remotely. The algorithms described above for switching color and power levels can be made "smarter" or more sophisticated when operated over a network. For example, the schedule of operation can be based on time of year, zip code, and operator setting.

In some embodiments, the communications interface may be used by one illuminator to control or otherwise affect another. For example, multiple illuminators can be "ganged together" in a master-slave configuration. The master illuminator is controlled remotely by an operator or computer. Then the master illuminator's controller will echo the control commands to the slave illuminators, thereby making them all work in concert, essentially as a single larger illuminator. The echoed control commands may or may not use the same encoding or physical interface. For example, the master may be controlled over an Ethernet interface, while the master may talk to the slaves via an RS-422 serial interface.

In some embodiments, the controller receives commands via the communications interface and controls the illuminator in accordance with the commands. For example, commands may be received instructing the illuminator to switch between energizing the IR light sources and the white light sources, provide a status indicating which light sources are energized, proceed to configure the illuminator to one of the stored preset configurations, or to perform other functions. Some commands may also affect an attached camera. For example, a command may instruct the camera to switch between day and night modes based on which light sources are currently energized in the multi-spectral illuminator.

Non-Circular Arrays

The embodiments described above all showed the LED and lens arrays as circular. However, radial symmetry is not necessary for proper functioning of the variable illumination angle mechanism. This is because the lens array only rotates through a small angle—a fraction of the angular spacing of the lenses and LEDs, as shown in FIGS. 21A-21C.

Figure 21C:
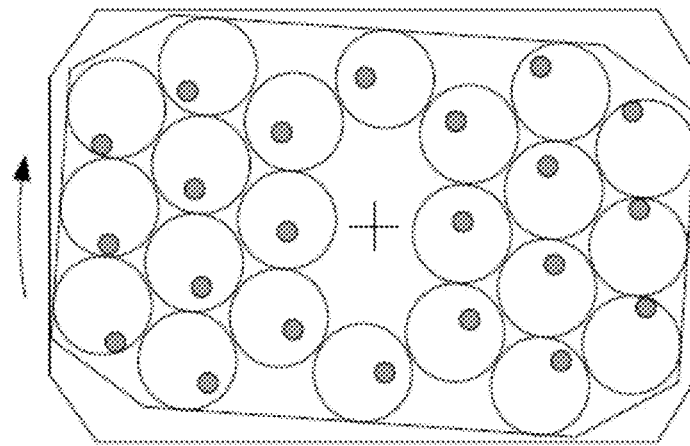
FIGS. 21A-21C illustrate configurations of components in an illuminator that generates an oblong illumination field, in accordance with embodiments of the invention.
Figure 21B:
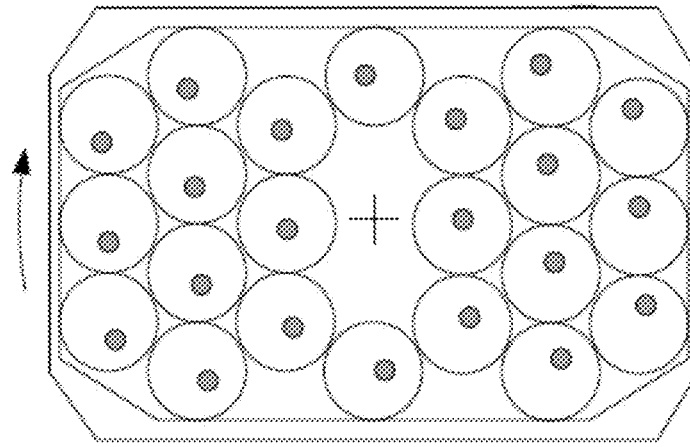
Figure 21A:
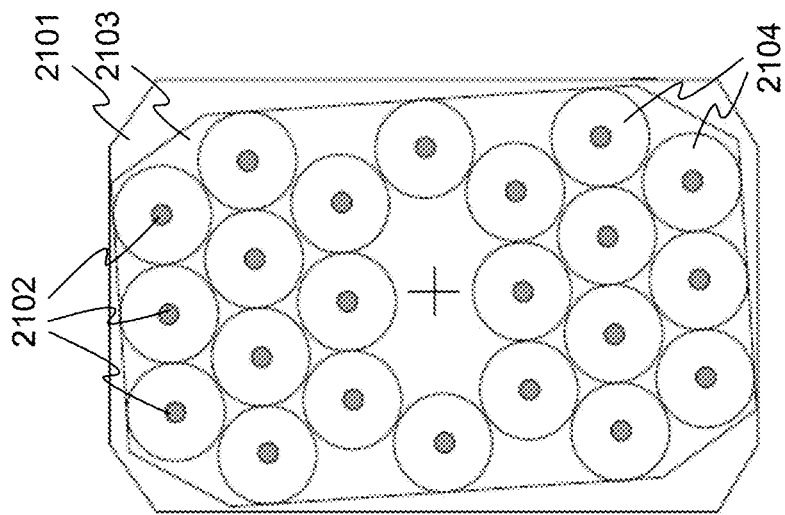

In FIG. 21A, a printed circuit board 2101 holds a plurality of light sources 2102, only some of which are labeled in FIG. 21A. In this example, only one kind of light sources is shown, and the resulting system would provide light of only a single color. However, it will be appreciated that the principles illustrated in FIGS. 21A-21C may be used in a multi-spectral illuminator as well. Returning to FIG. 21A, a lens plate 2103 includes a number of lenses 2104. In FIG. 21A, the lens plate is positioned such that the optical axis of each lens coincides with one of light sources 2102. Presuming that the axial distance between the light sources 2102 and lenses 2104 corresponds to the focal length of the lenses, the position of FIG. 21A is a "tele" setting, and produces a narrow beam having minimal divergence and therefore a relatively small illumination field.

In FIG. 21B, lens plate 2103 has been rotated slightly, so that lenses 2104 are no longer centered over light sources 2102. Although not visible in FIG. 21B, the axial distance between light sources 2102 and lenses 2104 may also have changed between the configuration of FIG. 21A and the configuration of 21B. The configuration of FIG. 21B thus produces a wider illumination field than the configuration of FIG. 21A.

In FIG. 21C, lens plate 2103 has been rotate further (and possibly translated as well), and may be at one extreme of its travel, producing wide angle illumination. Even so, lens plate 2103 has rotated only a few degrees.

The pattern of light sources 2102 and lenses 2104 in FIGS. 21A-21C is oblong in that it is generally rectangular. In other embodiments, the pattern may be generally oval, elliptical, or another oblong shape. Any shape or pattern of the lens and LED array will work, as long as there is the clearance needed for the small-angle rotation of the lens array. The shape of the lens and LED arrays has no appreciable effect on the far-field pattern of the light at the focused or tele position. This is true because the lenses create a series of superimposed images of the sources, projected at infinity. On the other hand, the wider-angle patterns generated at other lens positions are dependent on the array configuration. This is because the wide angle pattern is a composite of all of the defocused and fanned out images from all of the LEDs. A circular array will of course generate a circular pattern of illumination. In some situations, it may be advantageous to generate a non-circular illumination pattern. For example, a rectangular or elliptical pattern is useful to help illuminate an area that more closely matches the aspect ratio of the scene viewed a camera.

Figure 22:
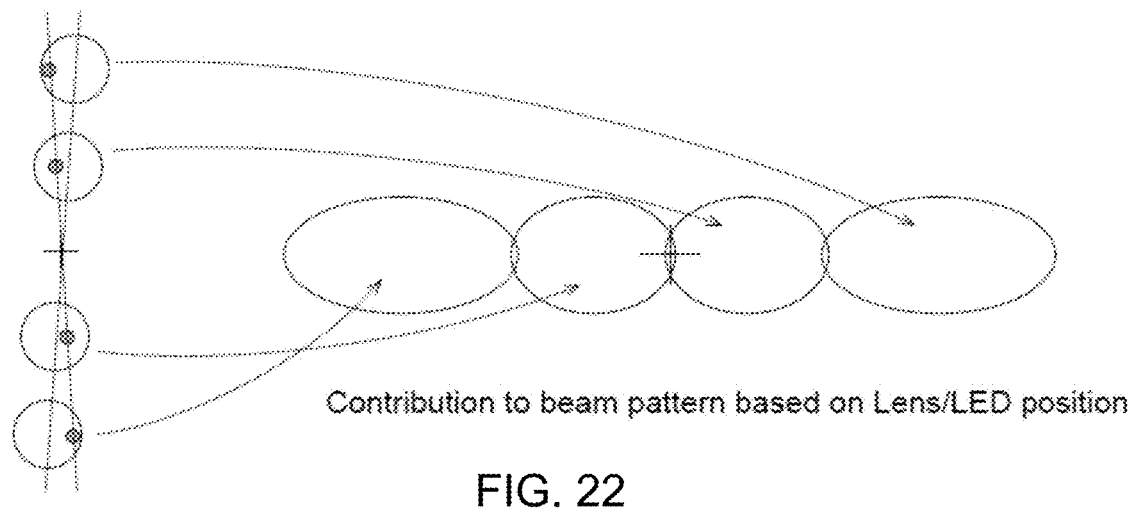
FIG. 22 illustrates the contribution of different lenses to a beam pattern, in accordance with embodiments of the invention.
Figure 23:
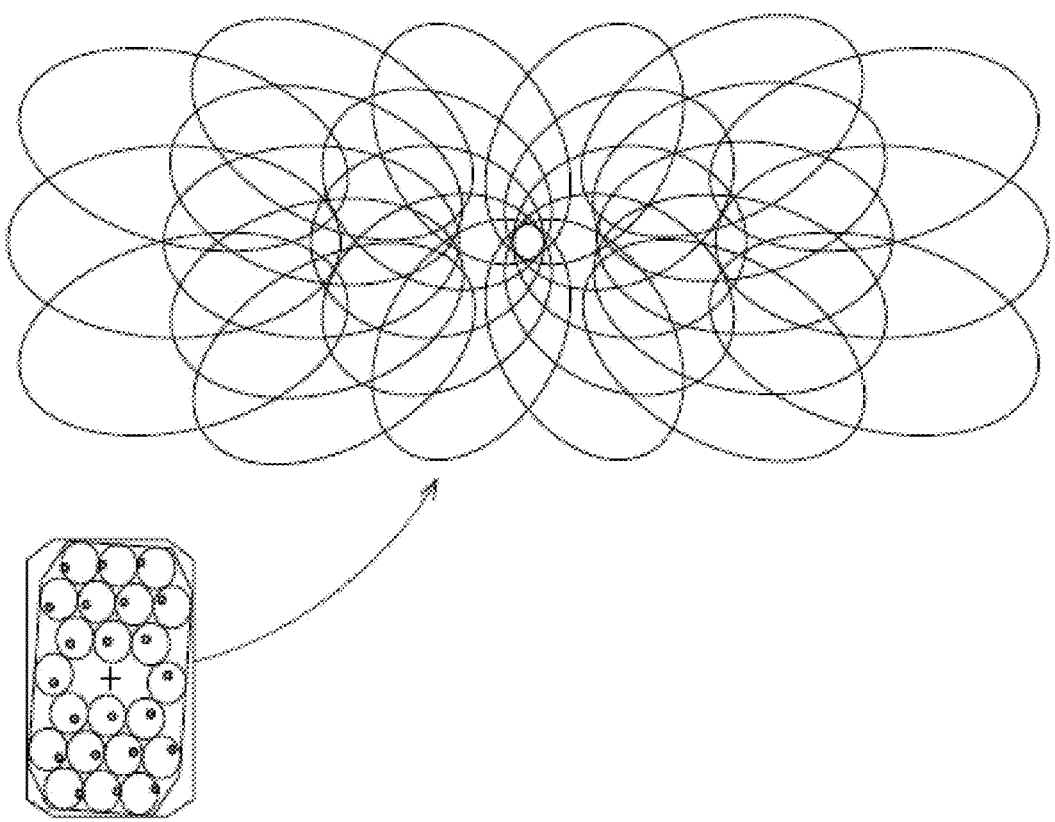
FIG. 23 illustrates an oblong illumination pattern, in accordance with embodiments of the invention.
Figure 24:
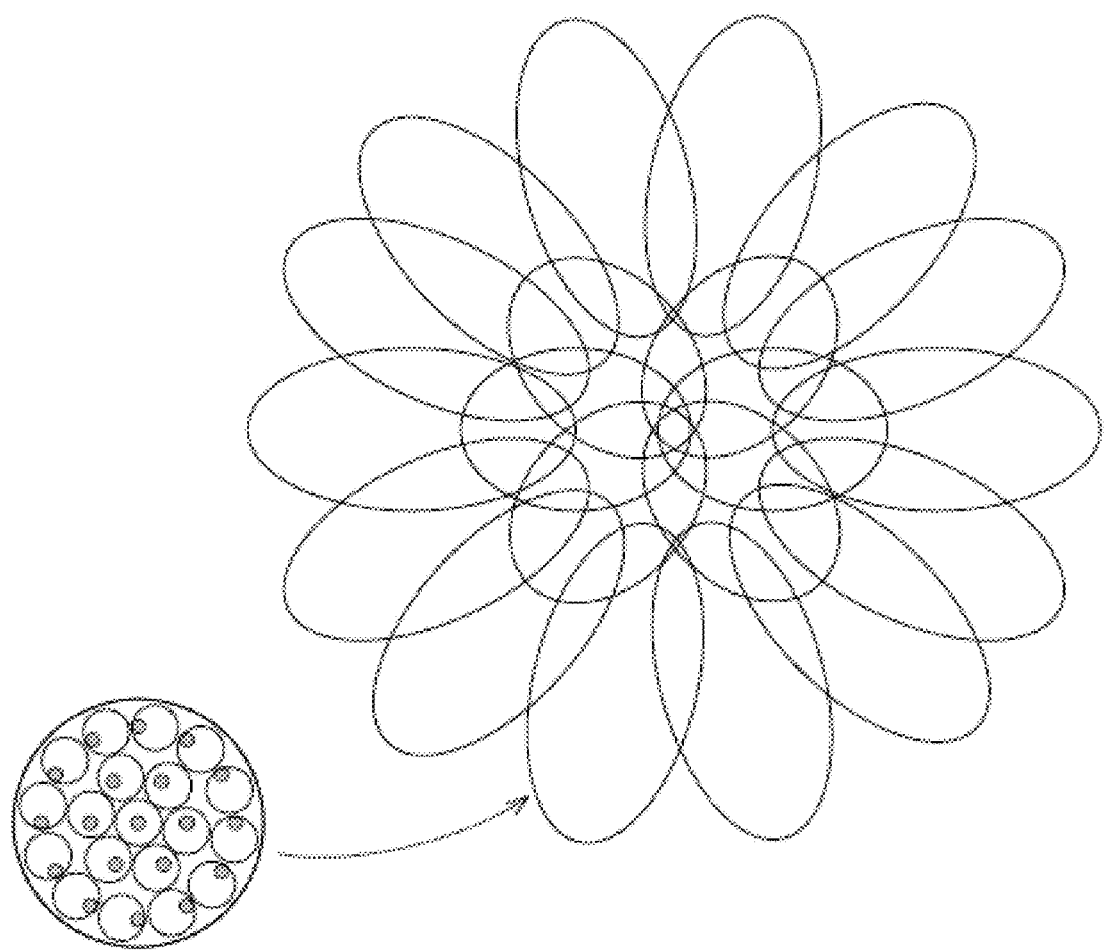
FIG. 24 illustrates a generally circular illumination pattern, in accordance with embodiments of the invention.

A lens array that is tall and thin will, when rotated and translated to its wide-angle position, generate a pattern that is short and fat, as is illustrated in FIG. 22. This is because the angle of skew for each individual beam is proportional to the lens's offset from the axis of its respective LED, and offset is proportional to the radial distance of the lens/LED from the center of rotation of the lens array. So the elements farthest away from the center will generate the most skewed beam, as is illustrated in FIG. 22. The direction of skew of the beam is in the direction of the offset of the lens. So if the lens array is tall and thin, the LED/lens elements on the top and bottom of the array are skewed the most, and in the horizontal direction, as desired, as shown in FIG. 23. A circular light source and lens pattern will generate a circular illumination pattern at the wide setting, as shown in FIG. 24.

While the non-circular configuration described above generates a non-circular, elongated illumination pattern at wide angle, the focused spot at the tele position is not elongated, for the reason described above. In some embodiments, an elongated illumination pattern is provided at the tele position as well. In one technique for generating an elongated tele spot, at least some of the lenses include an intentional aberration. For example, astigmatism will have exactly this effect. If the focal length of the lens curvature is different in the vertical axis than in the horizontal axis, the spot will be defocused in the horizontal direction when it is in best focus in the vertical direction, resulting in an elongated spot. Another technique for generating an oblong tele spot is to simply place the LEDs in the array with small horizontal offsets from the optical axes of the lenses. If some are displaced left and some right, the composite, overlapped pattern at best focus will be elongated.

While the figures and description above disclose certain embodiments having certain combinations of features, any of the disclosed features may be utilized in any workable combination. It is to be understood that any workable combination of the features and elements disclosed herein is also considered to be disclosed.

The invention has now been described in detail for the purposes of clarity and understanding. However, those skilled in the art will appreciate that certain changes and modifications may be practiced within the scope of the appended claims.

Embodiments

Embodiment 1. A multi-spectral variable focus illuminator, comprising: a plurality of first light sources arranged in a first array, each of the first light sources capable of emitting light in a first wavelength band; a plurality of second light sources arranged in a second array, each of the second light sources capable of emitting light in a second wavelength band different from the first wavelength band; and an array of lenses positioned in front of the first and second light sources, wherein the relative positions of the array of lenses and the first and second light sources are changeable such that the size of the field illuminated by the first light sources varies with the relative positions of the array of lenses and the first light sources, and the size of the field illuminated by the second light sources varies with the relative positions of the array of lenses and the second light sources.

Embodiment 2. The multi-spectral variable focus illuminator of embodiment 1, wherein the first wavelength band includes visible light and the second wavelength band consists or consists essentially of infrared light.

Embodiment 3. The multi-spectral variable focus illuminator of embodiment 2, wherein the visible light is white light.

Embodiment 4. The multi-spectral variable focus illuminator of any embodiments 2 and 3, wherein the infrared light is suitable for semi-covert surveillance.

Embodiment 5. The multi-spectral variable focus illuminator of any of embodiments 2-3, wherein the infrared light is completely invisible to the human eye.

Embodiment 6. The multi-spectral variable focus illuminator of embodiment 1, wherein both the first and second wavelength bands consist or consist essentially of infrared light.

Embodiment 7. The multi-spectral variable focus illuminator of any of the preceding embodiments, wherein the array of lenses is formed into a monolithic lens plate.

Embodiment 8. The multi-spectral variable focus illuminator of any of the preceding embodiments, wherein the array of first light sources and the array of second light sources are disposed on a single printed circuit board.

Embodiment 9. The multi-spectral variable focus illuminator of any of the preceding embodiments, wherein the array of second light sources is rotationally displaced from the array of first light sources about an axis substantially parallel to the optical axis of the multi-spectral variable focus illuminator.

Embodiment 10. The multi-spectral variable focus illuminator of any of the preceding embodiments, wherein the first light sources and the second light sources comprise light emitting diodes.

Embodiment 11. The multi-spectral variable focus illuminator of any of the preceding embodiments, wherein the array of lenses is movable in a combination of rotation about an axis parallel to the optical axis of the multi-spectral variable focus illuminator and translation along the axis parallel to the optical axis of the multi-spectral variable focus illuminator.

Embodiment 12. The multi-spectral variable focus illuminator of embodiment 11, wherein the translation and rotation are accomplished using a single actuator mechanism.

Embodiment 13. The multi-spectral variable focus illuminator of embodiment 12, wherein the actuator mechanism comprises one and only one motor.

Embodiment 14. The multi-spectral variable focus illuminator of any of the preceding embodiments, wherein the array of lenses is movable through a range of positions that includes: a position that results in light from the first light sources being directed into a narrow beam; a position that results in light from the first light sources being directed into a diverging beam; a position that results in light from the second light sources being directed into a diverging beam; and a position that results in light from the second light sources being directed into a narrow beam.

Embodiment 15. The multi-spectral variable focus illuminator of any of the preceding embodiments, wherein the array of lenses is movable through a range of positions that includes in order: a position that results in light from the first light sources being directed into a narrow beam; a position that results in light from the first light sources being directed into a diverging beam; a position that results in light from the second light sources being directed into a diverging beam; and a position that results in light from the second light sources being directed into a narrow beam.

Embodiment 16. The multi-spectral variable focus illuminator of any of embodiments 1-14, wherein the array of lenses is movable through a range of positions that includes in order: a position that results in light from the first light sources being directed into a diverging beam; a position that results in light from the first light sources being directed into a narrow beam; a position that results in light from the second light sources being directed into a narrow beam; and a position that results in light from the second light sources being directed into a diverging beam.

Embodiment 17. The multi-spectral variable focus illuminator of any of the preceding embodiments, wherein the axial distance of the array of lenses from the light sources is a piecewise linear function of the rotational angle of the array of lenses.

Embodiment 18. The multi-spectral variable focus illuminator of any of embodiments 1-16, wherein the axial distance of the array of lenses from the light sources is a curved function of the rotational angle of the array of lenses.

Embodiment 19. The multi-spectral variable focus illuminator of any of the preceding embodiments, further comprising a cam mechanism that defines the relationship of the axial and rotational positions of the array of lenses.

Embodiment 20. The multi-spectral variable focus illuminator of embodiment 19, wherein the cam mechanism comprises: a set of pins protruding from an outer edge of a monolithic plate that includes the array of lenses; and a set of guide blocks surrounding the plate, the guide blocks having grooves that engage the pins, the grooves shaped to define the relationship of the axial and rotational positions of the array of lenses.

Embodiment 21. The multi-spectral variable focus illuminator of any of the preceding embodiments, wherein only the first light sources or only the second light sources are energized at any one time.

Embodiment 22. The multi-spectral variable focus illuminator of any of the preceding embodiments, further comprising a plurality of third light sources arranged in a third array, each of the third light sources capable of emitting light in a third wavelength band different from the first and second wavelength bands, wherein the relative positions of the array of lenses and the first, second, and third light sources are changeable such that the size of the field illuminated by the third light sources varies with the relative positions of the array of lenses and the third light sources.

Embodiment 23. The multi-spectral variable focus illuminator of any of the preceding embodiments, further comprising a controller programmed or otherwise configured to control the operation of the multi-spectral variable focus illuminator.

Embodiment 24. The multi-spectral variable focus illuminator of embodiment 23, wherein the controller is configured to, upon switching from use of the first or second light sources to use of the other of the first or second light sources, automatically move the array of lenses so that the field illuminated by the light sources in use after the switch matches the field illuminated by the light sources that were in use prior to the switch.

Embodiment 25. The multi-spectral variable focus illuminator of any of embodiments 23-24, wherein the controller stores one or more preset configurations, and wherein when one of the preset configurations is selected, causes the multi-spectral variable focus illuminator to configure itself to match the parameter or parameters specified in the selected preset configuration.

Embodiment 26. The multi-spectral variable focus illuminator embodiment 25, wherein each preset configuration is selectable by a single command.

Embodiment 27. The multi-spectral variable focus illuminator of any of embodiments 25-26, wherein each preset configuration specifies which set of light sources to energize.

Embodiment 28. The multi-spectral variable focus illuminator of embodiment 25, wherein each preset configuration specifies one or more parameters selected from the group consisting of a power setting, a zoom setting, and which set of light sources to energize.

Embodiment 29. The multi-spectral variable focus illuminator of embodiment 25, wherein each preset configuration specifies a power setting, a zoom setting, and which set of light sources to energize.

Embodiment 30. The multi-spectral variable focus illuminator of any of embodiments 23-29, wherein the controller is configured to control the amount of power supplied to the light sources that are energized.

Embodiment 31. The multi-spectral variable focus illuminator of any of the preceding embodiments, wherein the amount of power supplied to the first light sources when they are energized is controllable independently of the amount of power supplied to the second light sources when they are energized.

Embodiment 32. The multi-spectral variable focus illuminator of any of embodiments 23-31, wherein the controller is configured to: detect an external event; and switch between the first and second light sources in reaction to the detection of the external event.

Embodiment 33. The multi-spectral variable focus illuminator of any of embodiments 23-32, wherein the multi-spectral variable focus illuminator is part of a system that includes a day/night camera, and wherein the controller is configured to switch from white light illumination to infrared illumination when the camera switches from a day mode to a night mode.

Embodiment 34. The multi-spectral variable focus illuminator of any of embodiments 23-33, wherein the multi-spectral variable focus illuminator is part of a system that includes a zoom camera, and wherein the controller is configured to: detect commands sent to the camera to cause the camera to adjust its zoom setting; and automatically adjust the size of the field of illumination produced by the multi-spectral variable focus illuminator to substantially match the field of view of the camera.

Embodiment 35. The multi-spectral variable focus illuminator of any of embodiments 23-34, wherein the controller further comprises a communication interface over which commands are received.

Embodiment 36. The multi-spectral variable focus illuminator of embodiment 35, wherein the controller is configured to, in response to a command received over the communication interface, switch between energizing the first light sources and energizing the second light sources.

Embodiment 37. The multi-spectral variable focus illuminator of any of embodiments 35-36, wherein the controller is configured to, in response to a command received over the communication interface, provide a status of the multi-spectral variable focus illuminator via the communication interface.

Embodiment 38. The multi-spectral variable focus illuminator of any of the preceding embodiments, wherein the first and second arrays are arranged such that when the array of lenses is positioned to illuminate a wide field, the aspect ratio of the illuminated field is different than the aspect ratio of the illuminated field when the array of lenses is positioned to illuminate a narrow field.

Embodiment 39. The multi-spectral variable focus illuminator of any of the preceding embodiments, wherein the first and second arrays are oblong.

Embodiment 40. The multi-spectral variable focus illuminator of embodiment 39, wherein the first and second arrays are taller than they are wide, and wherein the resulting illumination field is wider than it is tall.

Embodiment 41. The multi-spectral variable focus illuminator of any of the preceding embodiments, wherein the multi-spectral variable focus illuminator illuminates a non-circular field when the array of lenses is positioned to direct light into a narrow beam.

Embodiment 42. The multi-spectral variable focus illuminator of embodiment 41, wherein the non-circular field results from intentional aberration in at least some of the lenses in the array of lenses.

Embodiment 43. The multi-spectral variable focus illuminator of embodiment 41, wherein the non-circular field results from intentional offsets between the light sources and the optical axes of at least some of the lenses in the array of lenses.

Embodiment 44. The multi-spectral variable focus illuminator of any of the preceding embodiments, wherein: the first and second light sources are light emitting diodes and are mounted to a single printed circuit board in respective patterns rotationally displaced from each other about the optical axis of the multi-spectral variable focus illuminator; and the array of lenses is formed into a monolithic lens plate that is movable in a combination of rotation and translation through a range of positions that includes a position that results in light from the first light sources being directed into a narrow beam, a position that results in light from the first light sources being directed into a diverging beam, a position that results in light from the second light sources being directed into a diverging beam, and a position that results in light from the second light sources being directed into a narrow beam.

Embodiment 45. The multi-spectral variable focus illuminator of embodiment 44, wherein the first light sources produce white light and the second light sources produce light consisting or consisting essentially of infrared light.

Embodiment 46. A variable focus illuminator, comprising: an array of light sources arranged in an oblong pattern; and an array of lenses of lenses positioned in front of the array of light sources in the same oblong pattern, wherein the array of lenses is movable in a combination of rotation about the optical axis of the variable focus illuminator and translation along the optical axis of the variable focus illumination such that the size of the field of illumination produced by the variable focus illuminator varies with the relative positions of the array of lenses and the array of light sources; wherein, due to the oblong shape of the pattern, when the array of lenses is positioned such that the variable focus illuminator produces a narrow beam, the field of illumination is substantially circular, and when the array of lenses is positioned such that the variable focus illuminator produces a diverging beam, the field of illumination is oblong.

Embodiment 47. The variable focus illuminator of embodiment 46, wherein the oblong pattern of the light sources is disposed with its long axis being vertical, and the illumination field produced by the diverging beam has its long axis horizontal.

Embodiment 48. The variable focus illuminator of any of embodiments 46-47, wherein the array of light sources is an array of first light sources capable of emitting light in a first wavelength band, and the variable focus illuminator further comprises an array of second light sources arranged in a second oblong pattern, each of the second light sources capable of emitting light in a second wavelength band different from the first wavelength band; and wherein the array of lenses is movable to a range of positions including a position that results in light from the first light sources being directed into a narrow beam and the field of illumination being substantially circular, a position that results in light from the first light sources being directed into a diverging beam and the field of illumination being oblong, a position that results in light from the second light sources being directed into a diverging beam and the field of illumination being oblong, and a position that results in light from the second light sources being directed into a narrow beam and the field of illumination being substantially circular.

Embodiment 49. The variable focus illuminator of embodiment 48, wherein the array of light sources is an array of first light sources capable of emitting light in a first wavelength band, and the variable focus illuminator further comprises an array of second light sources arranged in a second oblong pattern, each of the second light sources capable of emitting light in a second wavelength band different from the first wavelength band; and wherein the array of lenses is movable through a range of positions that includes in order a position that results in light from the first light sources being directed into a narrow beam, a position that results in light from the first light sources being directed into a diverging beam, a position that results in light from the second light sources being directed into a diverging beam, and a position that results in light from the second light sources being directed into a narrow beam.

Embodiment 50. The variable focus illuminator of embodiment 48, wherein the array of light sources is an array of first light sources capable of emitting light in a first wavelength band, and the variable focus illuminator further comprises an array of second light sources arranged in a second oblong pattern, each of the second light sources capable of emitting light in a second wavelength band different from the first wavelength band; and wherein the array of lenses is movable through a range of positions that includes in order a position that results in light from the first light sources being directed into a diverging beam, a position that results in light from the first light sources being directed into a narrow beam, a position that results in light from the second light sources being directed into a narrow beam, and a position that results in light from the second light sources being directed into a diverging beam.

Embodiment 51. A variable focus illuminator, comprising: an array of light sources arranged in a first oblong pattern; and an array of lenses of lenses positioned in front of the array of light sources in a second oblong pattern, wherein the array of lenses is movable in a combination of rotation about the optical axis of the variable focus illuminator and translation along the optical axis of the variable focus illumination such that the size of the field of illumination produced by the variable focus illuminator varies with the relative positions of the array of lenses and the array of light sources; wherein, when the array of lenses is positioned such that the variable focus illuminator produces a narrow beam, the field of illumination is oblong.

Embodiment 52. The variable focus illuminator of embodiment 51, wherein the first and second oblong patterns are the same, and wherein the oblong illumination field results from intentional aberration in at least some of the lenses in the array of lenses.

Embodiment 53. The variable focus illuminator of embodiment 51, wherein the oblong illumination field results from intentional offsets between the light sources and the optical axes of at least some of the lenses in the array of lenses.

Embodiment 54. The variable focus illuminator of any of embodiments 51-53, wherein the array of light sources is an array of first light sources capable of emitting light in a first wavelength band, and the variable focus illuminator further comprises an array of second light sources arranged in a second oblong pattern, each of the second light sources capable of emitting light in a second wavelength band different from the first wavelength band; and wherein the array of lenses is movable to a range of positions including a position that results in light from the first light sources being directed into a narrow beam, a position that results in light from the first light sources being directed into a diverging beam, a position that results in light from the second light sources being directed into a diverging beam, and a position that results in light from the second light sources being directed into a narrow beam.

Embodiment 55. The variable focus illuminator of embodiment 54, wherein the array of light sources is an array of first light sources capable of emitting light in a first wavelength band, and the variable focus illuminator further comprises an array of second light sources arranged in a second oblong pattern, each of the second light sources capable of emitting light in a second wavelength band different from the first wavelength band; and wherein the array of lenses is movable through a range of positions that includes in order a position that results in light from the first light sources being directed into a narrow beam, a position that results in light from the first light sources being directed into a diverging beam, a position that results in light from the second light sources being directed into a diverging beam, and a position that results in light from the second light sources being directed into a narrow beam.

Embodiment 56. The variable focus illuminator of embodiment 54, wherein the array of light sources is an array of first light sources capable of emitting light in a first wavelength band, and the variable focus illuminator further comprises an array of second light sources arranged in a second oblong pattern, each of the second light sources capable of emitting light in a second wavelength band different from the first wavelength band; and wherein the array of lenses is movable through a range of positions that includes in order a position that results in light from the first light sources being directed into a diverging beam, a position that results in light from the first light sources being directed into a narrow beam, a position that results in light from the second light sources being directed into a narrow beam, and a position that results in light from the second light sources being directed into a diverging beam.

Embodiment 57. A method of illuminating a scene using a multi-spectral variable focus illuminator, the method comprising: energizing a plurality of first light sources arranged in a first array, each of the first light sources emitting light in a first wavelength band; adjusting the position of an array of lenses disposed in front of the plurality of first light sources such that the size of the field illuminated by light from the first light sources varies in size as the array of lenses moves; energizing a plurality of second light sources arranged in a second array, each of the second light sources emitting light in a second wavelength band different from the first wavelength band; and adjusting the position of the array of lenses such that the size of the field illuminated by light from the second light sources varies in size as the array of lenses moves.

Embodiment 58. The method of embodiment 57, wherein adjusting the position of the array of lenses comprises moving the array of lenses in a combination of translation along and rotation about an optical axis of an illuminator in which the first and second light sources and the array of lenses are comprised.

Embodiment 59. The method of any of embodiments 57-58, further comprising de-energizing the plurality of first light sources before energizing the plurality of second light sources.

Embodiment 60. The method of embodiment 59, further comprising, upon energizing the second plurality of light sources, automatically repositioning the array of lenses such that the size of the field illuminated by the second light sources matches the size of the field that was illuminated by the plurality of first light sources just prior to de-energizing the plurality of first light sources.

Embodiment 61. The method of any of embodiments 57-60, further comprising: storing one or more preset configurations in a memory comprised in the multi-spectral variable focus illuminator;
receiving a command to configure the multi-spectral variable focus illuminator into one of the preset configurations; and in response to the command, automatically configuring the multi-spectral variable focus illuminator into one of the preset configurations.

Embodiment 62. The method of embodiment 61, wherein automatically configuring the multi-spectral variable focus illuminator into one of the preset configurations comprises one or more operations selected from the group of operations consisting of setting the position of the array of lenses, energizing the plurality of first light sources or the plurality of second light sources, and setting a power level supplied to the energized plurality of light sources.

Embodiment 63. The method of any of embodiments 57-62, further comprising: detecting an external event; and switching between use of the first and second light sources in response to the event detection.

Embodiment 64. The method of any of embodiments 57-63, further comprising: detecting a command sent to a zoom camera associated with the multi-spectral variable focus illuminator, the command specifying a zoom setting for the camera; and in response to the detection, automatically adjusting the size of the field of illumination produced by the multi-spectral variable focus illuminator to substantially match the field of view of the camera at the specified zoom setting.

Embodiment 65. A system, comprising: a camera; and a multi-spectral variable focus illuminator, wherein the multi-spectral variable focus illuminator further includes: a plurality of first light sources arranged in a first array, each of the first light sources capable of emitting light in a first wavelength band; a plurality of second light sources arranged in a second array, each of the second light sources capable of emitting light in a second wavelength band different from the first wavelength band; and an array of lenses positioned in front of the first and second light sources, wherein the relative positions of the array of lenses and the first and second light sources are changeable such that the size of the field illuminated by the first light sources varies with the relative positions of the array of lenses and the first light sources, and the size of the field illuminated by the second light sources varies with the relative positions of the array of lenses and the second light sources.

Embodiment 66. The system of embodiment 65, wherein: the camera includes a zoom lens; and the multi-spectral variable focus illuminator further includes a motorized actuator configured to change the relative positions of the lens plate and the light sources to adjust the size of the field illuminated by the multi-spectral variable focus illuminator, to substantially match the field of view of the camera.

Embodiment 67. The system of any of embodiments 65-66, further comprising a pan/tilt mechanism to which both the camera and the multi-spectral variable focus illuminator are attached.

What is claimed is:

1. A multi-spectral variable focus illuminator, comprising:
a plurality of first light sources arranged in a first array, each of the first light sources capable of emitting light in a first wavelength band;
a plurality of second light sources arranged in a second array, each of the second light sources capable of emitting light in a second wavelength band different from the first wavelength band; and
an array of lenses positioned in front of the pluralities of first and second light sources, wherein the number of lenses in the array of lenses is smaller than the combined number of light sources in the first and second pluralities of light sources, and wherein the relative positions of the array of lenses and the pluralities of first and second light sources are changeable such that the size of the field illuminated by the first plurality of light sources varies with the relative positions of the array of lenses and the plurality of first light sources, and the size of the field illuminated by the plurality of second light sources varies with the relative positions of the array of lenses and the plurality of second light sources;
wherein the first and second pluralities of light sources are separately controllable such that either of the first and second pluralities of light sources can be energized while the other of the first and second pluralities of light sources is de-energized;
and wherein the multi-spectral variable focus illuminator is configured to position and hold the array of lenses such that at least some of the lenses in the array of lenses are rotationally decentered with respect to the energized plurality light sources about an optical axis of the illuminator, such that the size of the field illuminated by the energized plurality of light sources is determined in part by the prismatic effect of at least some of the plurality of lenses being misaligned with the energized plurality of light sources.

2. The multi-spectral variable focus illuminator of claim 1, wherein the first wavelength band includes visible light and the second wavelength band consists or consists essentially of infrared light.

3. The multi-spectral variable focus illuminator of claim 2 wherein the visible light is white light.

4. The multi-spectral variable focus illuminator of claim 1, wherein the plurality of first light sources and the plurality of second light sources are disposed on a single printed circuit board.

5. The multi-spectral variable focus illuminator of claim 4, wherein the array of the plurality of second light sources is rotationally displaced from the array of the plurality of first light sources about an axis substantially parallel to the optical axis of the multi-spectral variable focus illuminator.

6. The multi-spectral variable focus illuminator of claim 1, wherein the array of lenses is movable in a combination of rotation about an axis parallel to the optical axis of the multi-spectral variable focus illuminator and translation along the axis parallel to the optical axis of the multi-spectral variable focus illuminator.

7. The multi-spectral variable focus illuminator of claim 6, wherein the translation and rotation are accomplished using a single actuator mechanism, and wherein the actuator mechanism comprises one and only one motor.

8. The multi-spectral variable focus illuminator of claim 6, wherein the array of lenses is movable through a range of positions that includes:
    a position that results in light from the plurality of first light sources being directed into a narrow beam;
    a position that results in light from the plurality of first light sources being directed into a diverging beam;
    a position that results in light from the plurality of second light sources being directed into a diverging beam; and
    a position that results in light from the plurality of second light sources being directed into a narrow beam.

9. The multi-spectral variable focus illuminator of claim 6, further comprising a cam mechanism that defines the relationship of the axial and rotational positions of the array of lenses.

10. The multi-spectral variable focus illuminator of claim 1, further comprising a controller programmed or otherwise configured to control the operation of the multi-spectral variable focus illuminator.

11. The multi-spectral variable focus illuminator of claim 10, wherein the controller is configured to, upon switching from use of the first or second light sources to use of the other of the first or second light sources, automatically move the array of lenses so that the field illuminated by the light sources in use after the switch matches the field illuminated by the light sources that were in use prior to the switch.

12. The multi-spectral variable focus illuminator of claim 10, wherein the controller stores one or more preset configurations, and wherein when one of the preset configurations is selected, causes the multi-spectral variable focus illuminator to configure itself to match the parameter or parameters specified in the selected preset configuration, and wherein each preset configuration specifies a power setting, a zoom setting, and which set of light sources to energize.

13. The multi-spectral variable focus illuminator of claim 10, wherein the controller is configured to:
    detect an external event; and
    switch between the first and second light sources in reaction to the detection of the external event.

14. The multi-spectral variable focus illuminator of claim 10, wherein the multi-spectral variable focus illuminator is part of a system that includes a day/night camera, and wherein the controller is configured to switch from white light illumination to infrared illumination when the camera switches from a day mode to a night mode.

15. The multi-spectral variable focus illuminator of claim 10, wherein the multi-spectral variable focus illuminator is part of a system that includes a zoom camera, and wherein the controller is configured to:
    detect commands sent to the camera to cause the camera to adjust its zoom setting; and
    automatically adjust the size of the field of illumination produced by the multi-spectral variable focus illuminator to substantially match the field of view of the camera.

16. The multi-spectral variable focus illuminator of claim 10, wherein:
    the controller further comprises a communication interface over which commands are received;
    the controller is configured to, in response to a command received over the communication interface, switch between energizing the first light sources and energizing the second light sources; and
    the controller is configured to, in response to a command received over the communication interface, provide a status of the multi-spectral variable focus illuminator via the communication interface.

17. The multi-spectral variable focus illuminator of claim 1, wherein the first and second arrays of light sources and the array of lenses are arranged such that when the array of lenses is positioned to illuminate a wide field, the aspect ratio of the illuminated field is different than the aspect ratio of the illuminated field when the array of lenses is positioned to illuminate a narrow field.

18. The multi-spectral variable focus illuminator of claim 17, wherein the first and second arrays of light sources are oblong.

19. The multi-spectral variable focus illuminator of claim 18, wherein the first and second arrays of light sources are taller than they are wide, and wherein the resulting illumination field is wider than it is tall.

20. The multi-spectral variable focus illuminator of claim 1, wherein:
    the first and second light sources are light emitting diodes and are mounted to a single printed circuit board in respective patterns rotationally displaced from each other about the optical axis of the multi-spectral variable focus illuminator; and
    the array of lenses is formed into a monolithic lens plate that is moveable in a combination of rotation and translation through a range of positions that includes a position that results in light from the plurality of first light sources being directed into a narrow beam, a position that results in light from the plurality of first light sources being directed into a diverging beam, a position that results in light from the plurality of second light sources being directed into a diverging beam, and a position that results in light from the plurality of second light sources being directed into a narrow beam.

21. The multi-spectral variable focus illuminator of claim 20, wherein the first light sources produce white light and the second light sources produce light consisting or consisting essentially of infrared light.

22. A method of illuminating a scene using a multi-spectral variable focus illuminator, the method comprising:
    energizing a plurality of first light sources arranged in a first array, each of the first light sources emitting light in a first wavelength band;
    adjusting the position of an array of lenses disposed in front of the plurality of first light sources such that the size of the field illuminated by light from the plurality of first light sources varies in size as the array of lenses moves;
    de-energizing the plurality of first light sources;
    after the plurality of first light sources is de-energized, energizing a plurality of second light sources arranged in a second array, each of the second light sources emitting light in a second wavelength band different from the first wavelength band; and
    adjusting the position of the array of lenses such that the size of the field illuminated by light from the plurality of second light sources varies in size as the array of lenses moves, wherein adjusting the position of the array of lenses comprises moving the array of lenses in a combination of translation along and rotation about an optical axis of an illuminator in which the pluralities of first and second light sources and the array of lenses are comprised, and wherein adjusting the position of the array of lenses further comprises at times positioning the array of lenses such that the lenses are aligned with the energized plurality of light sources, and at other times positioning and holding the array of lenses such that at least some of the lenses in the array of lenses are rotationally decentered with respect to the energized plurality light sources about an optical axis of the illuminator, such that the size of the field illuminated by the energized plurality of light sources is determined in part by the prismatic effect of at least some of the plurality of lenses being misaligned with the energized plurality of light sources;

wherein the number of lenses in the array of lenses is smaller than the combined number of light sources in the first and second pluralities of light sources.

23. The method of claim 22, further comprising:

upon energizing the second plurality of light sources, automatically repositioning the array of lenses such that the size of the field illuminated by the plurality of second light sources matches the size of the field that was illuminated by the plurality of first light sources just prior to de-energizing the plurality of first light sources.

24. The method of claim 22, further comprising:

storing one or more preset configurations in a memory comprised in the multi-spectral variable focus illuminator;

receiving a command to configure the multi-spectral variable focus illuminator into one of the preset configurations; and in response to the command, automatically configuring the multi-spectral variable focus illuminator into one of the preset configurations, wherein automatically configuring the multi-spectral variable focus illuminator into one of the preset configurations comprises one or more operations selected from the group of operations consisting of setting the position of the array of lenses, energizing the plurality of first light sources or the plurality of second light sources, and setting a power level supplied to the energized plurality of light sources.

25. The method of claim 22, further comprising:

detecting an external event; and switching between use of the first and second pluralities of light sources in response to the event detection.

26. The method of claim 22, further comprising:

detecting a command sent to a zoom camera associated with the multi-spectral variable focus illuminator, the command specifying a zoom setting for the camera; and in response to the detection, automatically adjusting the size of the field of illumination produced by the multi-spectral variable focus illuminator to substantially match the field of view of the camera at the specified zoom setting.

* * * * *